(12) United States Patent
Li et al.

(10) Patent No.: US 11,474,266 B2
(45) Date of Patent: Oct. 18, 2022

(54) METHOD AND SYSTEM FOR MODELING A SUBSURFACE REGION

(71) Applicant: ExxonMobil Upstream Research Company, Spring, TX (US)

(72) Inventors: Jizhou Li, The Woodlands, TX (US); Jonathan D. Pietarila Graham, Los Alamos, NM (US)

(73) Assignee: ExxonMobil Upstream Research Company, Spring, TX (US)

( * ) Notice: Subject to any disclaimer, the term of this patent is extended or adjusted under 35 U.S.C. 154(b) by 938 days.

(21) Appl. No.: 16/219,128

(22) Filed: Dec. 13, 2018

(65) Prior Publication Data

US 2019/0187311 A1 Jun. 20, 2019

Related U.S. Application Data

(60) Provisional application No. 62/599,471, filed on Dec. 15, 2017.

(51) Int. Cl.
| | | |
|---|---|---|
| *G01V 1/28* | (2006.01) | |
| *E21B 41/00* | (2006.01) | |
| *E21B 21/08* | (2006.01) | |
| *E21B 49/08* | (2006.01) | |
| *G01V 1/50* | (2006.01) | |

(52) U.S. Cl.
CPC .............. *G01V 1/282* (2013.01); *E21B 21/08* (2013.01); *E21B 41/00* (2013.01); *E21B 49/088* (2013.01); *G01V 1/50* (2013.01); *E21B 49/0875* (2020.05); *G01V 2210/66* (2013.01)

(58) Field of Classification Search
CPC ...... G01V 1/282; G01V 1/50; G01V 2210/66; E21B 21/08; E21B 41/00; E21B 49/088; E21B 49/0875; E21B 21/00; E21B 21/082; E21B 21/085; E21B 41/0092; E21B 41/0099; E21B 49/087
See application file for complete search history.

(56) References Cited

U.S. PATENT DOCUMENTS

| | | | |
|---|---|---|---|
| 7,072,809 B2 | 7/2006 | Egermann et al. | |
| 8,301,428 B2 | 10/2012 | Lukyanov et al. | |
| 2010/0004914 A1* | 1/2010 | Lukyanov | E21B 43/00 703/2 |
| 2015/0142407 A1* | 5/2015 | Wakefield | E02D 1/027 703/10 |
| 2016/0040531 A1 | 2/2016 | Ramakrishnan et al. | |

* cited by examiner

*Primary Examiner* — Steven W Crabb
(74) *Attorney, Agent, or Firm* — Leandro Arechederra, III

(57) ABSTRACT

A method and system are described for creating subsurface models that involve the use of isomorphic reversible scanning curve for simulating hysteresis in reservoir simulators. The method includes constructing a subsurface model for a subsurface region and using the subsurface model in simulations and in hydrocarbon operations, such as hydrocarbon exploration, hydrocarbon development, and/or hydrocarbon production.

23 Claims, 9 Drawing Sheets

METHOD AND SYSTEM FOR MODELING A SUBSURFACE REGION

CROSS REFERENCE TO RELATED APPLICATION

This application claims the benefit of U.S. Provisional Application Ser. No. 62/599,471, filed Dec. 15, 2017, the disclosure of which is incorporated herein by reference in its entirety.

FIELD OF THE INVENTION

This disclosure relates generally to methods and systems for creating models and simulations of the subsurface for use in hydrocarbon operations, such as hydrocarbon exploration, hydrocarbon development, and/or hydrocarbon production operations. Specifically, the disclosure relates to methods and systems for creating subsurface models that may be used in reservoir simulators that utilize isomorphic reversible scanning curves for enhanced modeling and simulation of hysteresis in the subsurface. For example, the method may include constructing a subsurface model of a subsurface region and using the subsurface model in a reservoir simulator that simulates fluid flow in the subsurface region.

BACKGROUND

This section is intended to introduce various aspects of the art, which may be associated with exemplary embodiments of the present disclosure. This discussion is believed to assist in providing a framework to facilitate a better understanding of particular aspects of the present invention. Accordingly, it should be understood that this section should be read in this light, and not necessarily as admissions of prior art.

In hydrocarbon operations, such as hydrocarbon exploration, hydrocarbon development, and/or hydrocarbon production, different types of subsurface models may be used to represent subsurface regions. The subsurface models may include a description of subsurface structures and material properties for the subsurface region. For example, the subsurface model may comprise one or more of a geomechanical model, a geologic model, or a reservoir model. The subsurface model may represent measured or interpreted data for the subsurface region and may include objects (e.g., horizons, faults, surfaces, volumes, and the like). The subsurface model may also be discretized with a mesh or a grid that includes nodes and forms mesh elements (e.g., voxels or cells) within the model. By way of example, the subsurface model may be created from a structural framework (e.g., organization of objects) and provide defined compartments or sub-volumes. A geologic model may represent measured or interpreted data for the subsurface region, such as seismic data and well log data. The geologic model may be within a physical space or domain and may have material properties, such as rock properties. A reservoir model may be used to simulate flow of fluids within the subsurface region. Accordingly, the reservoir model may use the same mesh and/or mesh elements as other models, or may resample or upscale the mesh and/or mesh elements to lessen the computations for simulating the fluid flow.

To represent the subsurface region, properties may be associated with the cells in a subsurface model. By way of example, U.S. Patent Application Publication No. 2016/0040531 describes a method of characterizing earth formations using a physiochemical model. The method describes that the formation is described with a fundamental set of microscopic parameters, such that quantities relevant to petrophysical responses at a continuum or macroscopic level can be derived from them and used in modeling the formation. This reference does not provide verification that the conditions or criteria are satisfied.

As another example, U.S. Pat. No. 7,072,809 describes a method of modeling fluid displacements in a porous environment taking into account hysteresis effects.

As a further example, U.S. Pat. No. 8,301,428 describes a method of modeling a nonlinear hysteresis response of reservoir media. The method describes that solving of constitutive equations is a required step and appears to be limited to addressing capillary pressure. Unfortunately, the method does not appear to address relative permeability hysteresis. Further, the method does not appear to manage the physical requirements.

Accordingly, there remains a need in the industry for methods and systems that are more efficient and may lessen problems associated with characterizing subsurface properties in a subsurface model for use in hydrocarbon operations. Further, a need remains for efficient approaches for generating isomorphic reversible scanning curves for simulating hysteresis in reservoir simulators. The present techniques provide methods and systems that overcome one or more of the deficiencies discussed above.

SUMMARY

In one embodiment, a method for enhancing hydrocarbon operations for a subsurface region is described. The method comprises: obtaining a subsurface model associated with a subsurface region, wherein the subsurface model comprises a plurality of mesh elements; obtaining bounding curves for one or more of plurality of mesh elements; generating one or more isomorphic reversible scanning curves for the one or more of plurality of mesh elements; simulating fluid flow within the subsurface model, wherein the one or more isomorphic reversible scanning curves are used in the simulation to model fluid heuristics and displacement; and outputting results from the simulation of the subsurface model.

In one embodiment, a system for generating a subsurface model associated with a subsurface region is described. The system comprises: a processor; an input device in communication with the processor and configured to receive input data associated with a subsurface region; memory in communication with the processor, the memory having a set of instructions, wherein the set of instructions, when executed by the processor, are configured to: obtain a subsurface model associated with a subsurface region, wherein the subsurface model comprises a plurality of mesh elements; obtain bounding curves for one or more of plurality of mesh elements; generate one or more isomorphic reversible scanning curves for the one or more of plurality of mesh elements; simulate fluid flow within the subsurface model, wherein the one or more isomorphic reversible scanning curves are used in the simulation to model fluid heuristics and displacement; and output results from the simulation of the subsurface model.

BRIEF DESCRIPTION OF THE DRAWINGS

The advantages of the present invention are better understood by referring to the following detailed description and the attached drawings.

DETAILED DESCRIPTION

Figure 1:
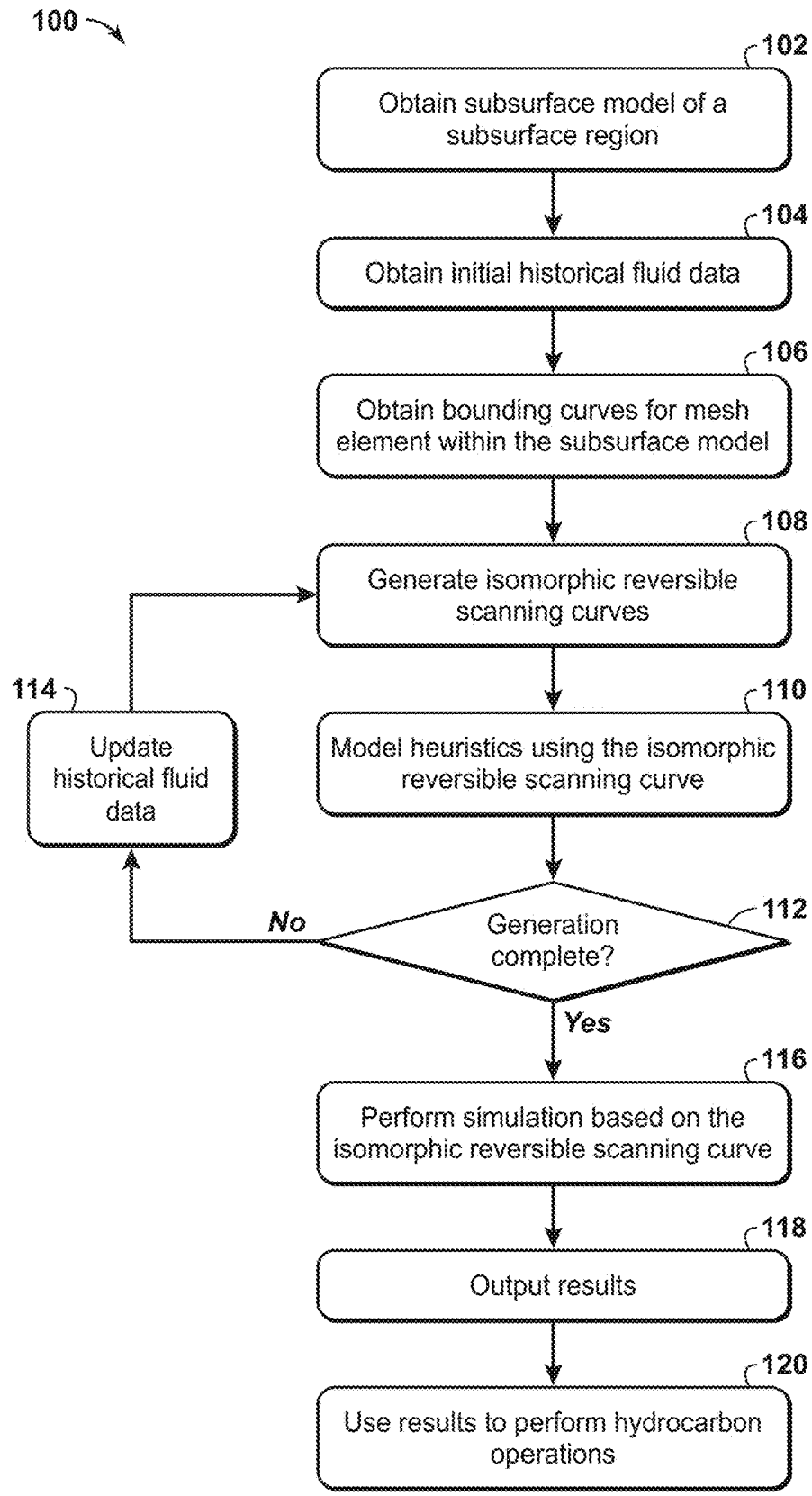
FIG. 1 is an exemplary flow chart in accordance with the present techniques.

In the following detailed description section, the specific embodiments of the present disclosure are described in connection with preferred embodiments. However, to the extent that the following description is specific to a particular embodiment or a particular use of the present disclosure, this is intended to be for exemplary purposes only and simply provides a description of the exemplary embodiments. Accordingly, the disclosure is not limited to the specific embodiments described below, but rather, it includes all alternatives, modifications, and equivalents falling within the true spirit and scope of the appended claims.

Various terms as used herein are defined below. To the extent a term used in a claim is not defined below, it should be given the broadest definition persons in the pertinent art have given that term as reflected in at least one printed publication or issued patent.

The articles "the", "a", and "an" are not necessarily limited to mean only one, but rather are inclusive and open ended so as to include, optionally, multiple such elements.

As used herein, the term "hydrocarbons" are generally defined as molecules formed primarily of carbon and hydrogen atoms such as oil and natural gas. Hydrocarbons may also include other elements or compounds, such as, but not limited to, halogens, metallic elements, nitrogen, oxygen, sulfur, hydrogen sulfide ($H_2S$), and carbon dioxide ($CO_2$). Hydrocarbons may be produced from hydrocarbon reservoirs through wells penetrating a hydrocarbon containing formation. Hydrocarbons derived from a hydrocarbon reservoir may include, but are not limited to, petroleum, kerogen, bitumen, pyrobitumen, asphaltenes, tars, oils, natural gas, or combinations thereof. Hydrocarbons may be located within or adjacent to mineral matrices within the earth, termed reservoirs. Matrices may include, but are not limited to, sedimentary rock, sands, silicilytes, carbonates, diatomites, and other porous media.

As used herein, "hydrocarbon exploration" refers to any activity associated with determining the location of hydrocarbons in subsurface regions. Hydrocarbon exploration normally refers to any activity conducted to obtain measurements through acquisition of measured data associated with the subsurface formation and the associated modeling of the data to identify potential locations of hydrocarbon accumulations. Accordingly, hydrocarbon exploration includes acquiring measurement data, modeling of the measurement data to form subsurface models, and determining the likely locations for hydrocarbon reservoirs within the subsurface. The measurement data may include seismic data, gravity data, magnetic data, electromagnetic data, and the like.

As used herein, "hydrocarbon development" refers to any activity associated with planning of extraction and/or access to hydrocarbons in subsurface regions. Hydrocarbon development normally refers to any activity conducted to plan for access to and/or for production of hydrocarbons from the subsurface formation and the associated modeling of the data to identify preferred development approaches and methods. By way of example, hydrocarbon development may include modeling of the subsurface formation and extraction planning for periods of production, determining and planning equipment to be utilized and techniques to be utilized in extracting the hydrocarbons from the subsurface formation, and the like.

As used herein, "hydrocarbon operations" refers to any activity associated with hydrocarbon exploration, hydrocarbon development and/or hydrocarbon production.

As used herein, "hydrocarbon production" refers to any activity associated with extracting hydrocarbons from subsurface location, such as a well or other opening. Hydrocarbon production normally refers to any activity conducted to form the wellbore along with any activity in or on the well after the well is completed. Accordingly, hydrocarbon production or extraction includes not only primary hydrocarbon extraction, but also secondary and tertiary production techniques, such as injection of gas or liquid for increasing drive pressure, mobilizing the hydrocarbon or treating by, for example, chemicals, hydraulic fracturing the wellbore to promote increased flow, well servicing, well logging, and other well and wellbore treatments.

As used herein, "subsurface model" refers to a model of a subsurface region and may include a reservoir model, geomechanical model, and/or a geologic model. The subsurface model may include subsurface data distributed within the model in two-dimensions (2-D) (e.g., distributed into a plurality of cells, such as mesh elements or blocks), three-dimensions (3-D) (e.g., distributed into a plurality of voxels), or more dimensions.

As used herein, a "geologic model" is a subsurface model (e.g., a 2-D model or a 3-D model) of the subsurface region having static properties and includes objects, such as faults and/or horizons, and properties, such as facies, lithology, porosity, permeability, or the proportion of sand and shale.

As used herein, a "reservoir model" is a subsurface model (e.g., a 2-D model or a 3-D model) of the subsurface that in addition to static properties, such as porosity and permeability, also has dynamic properties that vary over the timescale of resource extraction, such as fluid composition, pressure, and relative permeability.

As used herein, a "geomechanical model" is a model (e.g., a 2-D model or a 3-D model) of the subsurface that contain properties, such as static properties and may model responses to changes in stress, such as mechanical response. The static properties may include properties, such as rock compressibility and Poisson's ratio, while the mechanical response may include compaction, subsidence, surface heaving, faulting, and seismic events, which may be a response to fluid injection and extraction from the subsurface region.

As used herein, "structural framework" or "framework" refer to a subsurface representation formed from objects (e.g., faults, horizons, other surfaces and model boundaries). For example, the framework is a subsurface representation that contains surfaces and polylines. A framework may be formed by surfaces of geologic, engineering, planning, or other technical relevance.

As used herein, "zone", "region", "container", or "compartment" is a defined space, area, or volume contained in the framework or model, which may be bounded by one or more objects or a polygon encompassing an area or volume of interest. The volume may include similar properties.

As used herein, "mesh" or "grid" is a representation of a region of space (e.g., 2-D domain or 3-D domain), which includes nodes that may form mesh elements, such as polygons or polyhedra, disposed within the region (e.g., a volumetric representation). The mesh may represent surfaces, horizons, faults, and/or other objects by a set of nodes, which may include various mesh elements in the form of polygons or polyhedra, disposed within the region. Properties may be assigned to or associated with the mesh elements.

As used herein, "simulate" or "simulation" is the process of performing one or more operations using a subsurface model and any associated properties to create simulation results. For example, a simulation may involve computing a prediction related to the resource extraction based on a reservoir model. A reservoir simulation may involve performing by execution of a reservoir-simulator computer program on a processor, which computes composition, pressure, and/or movement of fluid as a function of time and space for a specified scenario of injection and production wells by solving a set of reservoir fluid flow equations. A geomechanical simulation may involve performing by execution of a geomechanical simulator computer program on a processor, which computes displacement, strain, stress, shear slip, and/or energy release of the rock as a function of time and space in response to fluid extraction and injection.

As used herein "forward mechanical models" include FEM-DEM, DEM, and/or continuum analysis where rock layers are deformed from an initial position to a final geometry.

As used herein, "DEM" refers to Discrete Element Methods, which are numerical methods for computing the motion of large numbers of particles or elements, which represent a subsurface region herein.

As used herein, "FEM" refers to Finite Element Methods, which are numerical techniques for solving engineering problems by dividing a region into smaller mesh elements such that the combined properties of the smaller mesh elements contain the properties of the region.

In hydrocarbon operations, a subsurface model is created in the physical space or domain to represent the subsurface region. The subsurface model is a computerized representation of a subsurface region based on geophysical and geological observations made on and below the surface of the Earth. The subsurface model may be a numerical equivalent of a reservoir map (e.g., 2-D reservoir map or 3-D reservoir map) complemented by a description of physical quantities in the domain of interest. The subsurface model may include multiple dimensions and is delineated by objects, such as horizons, fractures, and faults. The subsurface model may include a structural framework of objects, such as faults, fractures, and horizons. Within the subsurface models, a grid or mesh may be used to partition the model into different sub-volumes, which may be used in hydrocarbon operations, such as reservoir simulation studies in hydrocarbon exploration, hydrocarbon development, and/or hydrocarbon production operations, as well as for representing a subsurface model description of a reservoir structure and material properties. The subsurface model may include a mesh or grid of nodes to divide the structural framework and/or subsurface model into mesh elements, which may include cells or blocks in 2-D, or voxels in 3-D, or other suitable mesh elements in other dimensions. Accordingly, the mesh may be configured to form mesh elements that may represent material properties, such as rock and fluid properties, of a reservoir or may be used for numerical discretization of partial differential equations, such as fluid flow or wave propagation.

To understand the flow of fluids within the subsurface regions represented by the subsurface model, reservoir simulations may be performed. For example, reservoir simulations may be relied upon to determine well locations, well orientations, and/or specific regions that may be used to economically produce hydrocarbons from a subsurface region. Further, reservoir simulations may be used to enhance hydrocarbon operations associated with a subsurface region, which may include asset acquisition evaluation, selection of drill site and completion zones and/or equipment, and/or stimulation or injection planning.

In certain configurations, reservoir simulations may use reversible scanning curves to model the effect of history-dependent trapping of the wetting phase by the non-wetting phase in the transition zone of the subsurface known as hysteresis. The reversible scanning curves may be constructed between imbibition curves and drainage curves that are based on historical extreme saturations. In general, the reversible scanning curves generation algorithm for hysteresis relies upon historical fluid saturation. However, it is difficult to implement an efficient and reliable algorithm to capture the phenomenon. For example, conventional approaches may not accurately model the physical world and are often computationally inefficient and may significantly slow down the simulation.

Thus the scanning curves described herein may be used to simplify the hysteresis loop (e.g., one side of the loop illustrating using water to push oil and the other side of the loop illustrating using oil to push water) into one line.

Accordingly, the present techniques utilize an isomorphic reversible scanning curves generation algorithm to provide enhancements to methods and systems for subsurface modeling and reservoir simulations. By way of example, the methods and systems described herein may provide one or more constraints that operate to (i) bound scanning curves by drainage and imbibition curves; (ii) prevent scanning curves from crossing; (iii) converge the scanning curves to the imbibition curve as historical minimum water saturation or historical extreme saturation approaches irreducible water saturation; and (iv) start the scanning curve at the historical extreme saturation on the drainage curve and end on the connector. Additionally, the methods and systems described herein may calculate relative permeability and capillary pressure in a more computationally efficient manner and do not involve unnecessary user intervention.

The present techniques utilize the mathematical concept of isomorphism to provide a mechanism for generating scanning curves corresponding to a subsurface historical saturation. By way of example, the present techniques provide a mapping of each historical extreme saturation to a unique scanning curve value at a given saturation between the imbibition and drainage curves. Further, the present techniques may define the scanning curves as convex combinations of the imbibition curves and drainage curves. In addition, the present techniques may utilize external data, such as laboratory data or calculated data, for the scanning curve generation algorithm to generate a capillary pressure and/or relative permeability for reservoir simulation. The scanning curves for capillary pressure may also be described as convex combination bounding imbibition and drainage curves. Moreover, the scanning curves may be generated by solving for the constitutive equations.

As an example, the reversible scanning curves may be constructed between the imbibition curves and drainage curves based on the historical minimal water saturations ($S_{wi}$) for water relative permeability ($K_{rw}$), oil relative permeability in relation to water ($K_{row}$), and water-oil capillary pressure ($P_{cow}$) and based on historical maximal gas saturation ($S_{gi}$) for gas relative permeability ($K_{rg}$), oil relative permeability in relation to gas ($K_{rog}$), and gas-oil relative permeability ($P_{cgo}$). The reversible scanning curve may start at a historical minimal water saturation ($S_{wi}$) on the drainage curve and may be bounded by imbibition curves and drainage bounding curves. Physically, each historical minimum water saturation ($S_{wi}$) corresponds to a unique scanning curve and should not intersect with scanning curves corresponding to different historical minimal water saturation. As historical minimum water saturation ($S_{wi}$) approaches the irreducible water saturation ($S_{wir}$), the scanning curve values closely follow the values of the imbibition curve. This is also true for water relative permeability ($K_{rw}$), oil relative permeability in relation to water ($K_{row}$), and water-oil capillary pressure ($P_{cow}$). For gas relative permeability ($K_{rg}$), oil relative permeability in relation to gas ($K_{rog}$), and gas-oil relative permeability ($P_{cgo}$), these values depend on the historical maximal gas saturation ($S_{gi}$), not the historical minimal water saturation. Accordingly, the values of these parameters follow the shape of the imbibition curve when historical maximal gas saturation ($S_{gi}$) reaches one minus irreducible water saturation ($1-S_{wir}$) for oil relative permeability in relation to gas ($K_{rog}$) and gas-oil relative permeability ($P_{cgo}$) and one minus irreducible water saturation minus relict oil saturation $S_{org}$ ($1-S_{wir}-S_{org}$) for gas relative permeability ($K_{rg}$).

Accordingly, the present techniques provide various enhancements by managing various criteria, which may be referred to as constraints on the scanning curves. For example, the constraints on the scanning curves include the following criteria: i) each scanning curve is between the bounding imbibition curve and drainage curve; ii) any two scanning curves with different historical extreme saturation do not overlap; iii) each scanning curve takes on the value of the drainage curve at historical minimum water saturation ($S_{wi}$) and the specified connector curve at one minus historical minimal oil saturation or residual oil saturation $S_{or}$ ($1-S_{or}$); and iv) as the historical minimum water saturation $S_{wi}$ approaches irreducible water saturation $S_{wir}$, the values of the scanning curves are the same as the values of the bounding imbibition curve. As a result, the present techniques provides reversible scanning curves that may be distinct mesh element-by-mesh element and region-by-region; and/or may be constructed mesh element-by-mesh element and evaluated during the simulation as part of the property calculations.

By way of example, to resolve the non-physicality of the reversible scanning curve, the present techniques may use parameter-free isomorphic scanning curve generation algorithms to generate reversible scanning curves for reservoir simulations. Accordingly, the parameter-free isomorphic scanning curve generation algorithms may be represented as an Isomorphic Algorithm (IA) expressed in following mathematical formulation in equation (e1):

$$kr^{scan}(s_w, s_{wi}) = \alpha(s_w, s_{wi})(kr^{drn}(s_w^{drn}(s_w, s_{wi})) - kr^{imb}(s_w^{imb}(s_w, s_{wi}))) + kr^{imb}(s_w^{imb}(s_w, s_{wi})) \quad (e1)$$

where $\alpha(s_w, s_{wi})$ is a weight function that has a value in the range between 0 and 1; $s_w^{drn}(s_w, S_{wi})$ is the sample saturation value on drainage curve and has a function value in a range between $s_w$ and $k_r^{drn^{-1}}(k_r^{imb}(s_w))$; and $s_w^{imb}(s_w, s_{wi})$ is the sample saturation value on the imbibition curve and has a function value in a range between $s_w$ and $k_r^{imb^{-1}}(k_r^{drn}(s_w))$. At one of the functions of the sample saturation value on the drainage curve $s_w^{drn}$, sample saturation value on the imbibition curve $s_w^{imb}$ and $\alpha$ is an isomorphism map. Further, $k_r^{scan}$ is the relative permeability, $k_r^{drn}$ is the drainage curve and $k_r^{imb}$ is the imbibition curve. While this is for the relative permeability, this may be used for any displacement pairs. The displacement pairs apply to relative permeability $K_{rw}$, $K_{row}$, $K_{rg}$, and $K_{rog}$ and capillary pressure $P_{cow}$ and $P_{cgo}$. The displacement pairs may be imbibition curves with drainage curves. The IA may be constructed into various parameter-free isomorphic scanning curve generation algorithms, which may be varied based on the selection of the functions for sample saturation value on the imbibition curve $s_w^{imb}$, sample saturation value on the drainage curve $s_w^{drn}$, and $\alpha$. By way of example, the isomorphism map $\alpha$ may be weighted function between 0 and 1. The resulting scanning curves may be convex combination of both imbibition and drainage curve. The selection of the functions may be used in the IA to create different algorithms, such as Forward Isomorphic Algorithm (FIA), Scale and Shift Isomorphic Algorithm (SSIA), Convex Isomorphic Algorithm (CIA) and/or Inverse Isomorphic Algorithm (IIA), as examples. The algorithms may be created by changing the weight function $\alpha$, and the sampling the saturations on the imbibition and drainage curves.

In one configuration, a FIA may be used, which may generate the scanning curves for water relative permeability $K_{rw}$ and oil relative permeability in relation to gas $K_{rog}$. The FIA is given as follows equations (e2) and (e3):

$$kr^{scan}(s_w, s_{wi}) = \begin{cases} \alpha(s_w, s_{wi})(kr^{imb}(s_w) - kr^{drn}(s_w)) + kr^{drn}(s_w) & \text{for all } s_{wi} < s_w \leq 1 - s_{orw} \\ \alpha(s_w, s_{wi})(kr^{conn}(s_w) - kr^{drn}(s_w)) + kr^{drn}(s_w) & \text{for all } 1 - s_{orw} < s_w \leq 1 - s_{or} \end{cases} \quad (e2)$$

with $$\alpha(s_w, s_{wi}) = \begin{cases} \dfrac{s_w - s_{wi}}{s_w - s_{wir}} & \text{for all } s_{wi} < s_w \leq 1 - s_{orw} \\ \dfrac{s_w - s_{wi}}{s_w - s_{wi}^*(s_w)} & \text{for all } 1 - s_{orw} < s_w \leq 1 - s_{or} \end{cases} \quad (e3)$$

The map α is an isomorphism map that relates the historical minimal saturation prior to the current saturation ($S_w$) to the percentage of the imbibition function value, while the historical minimal saturation corresponding to the saturation $S_w$ on the connector curve $S^*_{wi}$ is a function that relates current saturation $S_w$ in between one minus residual oil saturation after water flood $S_{orw}$ (1-$S_{orw}$) and one minus residual oil saturation ($S_{or}$) (1-$S_{or}$) to the corresponding historical extreme saturation $S^*_{wi}$. Further, isomorphism map α may be a weighted function between 0 and 1, which may involve scanning curves that may be convex combination of both imbibition and drainage curve. Here, $k_r^{conn}$ is a connector curve, which is the curve connecting the endpoint of imbibition curve and the endpoint of the drainage curve.

The isomorphism map α manages the unique convex combination of the drainage curve and imbibition curve at the current saturation $S_w$. Also, α is defined to be in the range between 0 and 1. Therefore, the scanning curves generated are between the bounding curves (e.g., the respective the drainage curve and imbibition curve).

In addition to the FIA, another configuration of a parameter-free isomorphic scanning curve generation algorithm to generate reversible scanning curves may include SSIA. The SSIA may be used to generate the reversible scanning curves for oil relative permeability in relation to water $K_{row}$, gas relative permeability $K_{rg}$, water-oil capillary pressure $P_{cow}$ and gas-oil relative permeability $P_{cgo}$. The algorithm may be presented in following mathematical relationship as follows in equations (e4), (e5), and (e6):

$$kr^{scan}(s_w, s_{wi}) = \begin{cases} kr^{imb}(\alpha(s_w, s_{wi})(s_w - s_{imb}(s_w)) + s_{imb}(s_w)) & \text{for all } s_{wi} < s_w \leq 1 - s_{orw} \\ kr^{imb}(\alpha(s_w, s_{wi})((1 - s_{orw}) - s_{imb}(s_w)) + s_{imb}(s_w)) & \text{for all } 1 - s_{orw} < s_w \leq 1 - s_{or} \end{cases} \quad (e4)$$

with $$\alpha(s_w, s_{wi}) = \begin{cases} \dfrac{s_w - s_{wi}}{s_w - s_{wir}} & \text{for all } s_{wi} < s_w \leq 1 - s_{orw} \\ \dfrac{s_w - s_{wi}}{s_w - s^*_{wi}(s_w)} & \text{for all } 1 - s_{orw} < s_w \leq 1 - s_{or} \end{cases} \quad (e5)$$

and $$s_{imb} = kr^{imb^{-1}}(kr^{drn}(s_w)) \quad (e6)$$

The isomorphism map α may be the same as the one associated with the FIA configuration, as noted above. Further, the isomorphism map α may be a weighted function between 0 and 1. The resulting scanning curves may be convex combination of both imbibition and drainage curve. The isomorphism map provides a unique value for each scanning curve corresponding to a historical extreme saturation. The convex combination of the saturation manages the scanning curve value to be bounded between the bounding curves for each current saturation $S_w$.

The SSIA involves performing an inverse lookup of the imbibition curve. Therefore, the imbibition curve may be monotonically increasing for it to be invertible. Also, the end point of the scanning curve of the capillary pressure curve may have the same value as the end point value of the imbibition curve.

Yet another configuration of a parameter-free isomorphic scanning curve generation algorithm to generate reversible scanning curves may include CIA. The CIA may specifically be utilized for the capillary pressure curves. The CIA is presented as follows in equations (e7) and (e8):

$$p_c^{scan}(s_w, s_{wi}) = \beta(s_{wi})(p_c^{drn}(s_w) - p_c^{imb-ssi}(s_w, s_{wi})) + p_c^{imb-ssi}(s_w, s_{wi}) \quad (e7)$$

where $p_c^{imb-ssi}(s_w, s_{wi})$ is obtained using the shift and scale isomorphism in the scanning curve value obtained using SSIA algorithm in equation (e4) and $$\beta(s_{wi}) = \frac{p_c^{scan}(1 - s_{or}(s_{wi})) - p_c^{imb}(1 - s_{orw})}{p_c^{drn}(1 - s_{or}(s_{wi})) - p_c^{imb}(1 - s_{orw})} \quad (e8)$$

where $p_c^{scan}$ is scanning curve, $p_c^{drn}$ is drainage curve, $p_c^{imb}$ is imbibition curve.

The algorithm involves the convex combination of the value obtained from the SSIA and the drainage curve value at the current saturation $S_w$. The algorithm also provides uniqueness of the path of the scanning curve corresponding to every historical extreme saturation. As a result, the CIA may be considered as a combination of the FIA and SSIA.

Further still, another configuration of a parameter-free isomorphic scanning curve generation algorithm to generate reversible scanning curves may include IIA. The IIA may be applied to all displacement curves. This algorithm creates an isomorphism map $\alpha(f^{(n)},*)$ from $(S_{wir}, S_w)$ to $(K_r^{imb}(f^{(n)})^{-1}, K_r^{drn}(f^{(n)})^{-1})$, when $f^{(n)}$ is the n-th guess of the displacement function value. In the isomorphism map, * is the historical minimal saturation $S_{wi}$, while $f^{(n)}$ is the nth guess of the scanning curve value. The scanning curve value at current saturation $S_w$ is f* such that $\alpha(f^*, S_{wi})=S_w$ and f* is the scanning curve value at $S_w$ with historical extreme saturation $S_{wi}$. Accordingly, the scanning curves are generated by solving a non-linear equation. The scanning curves may be generated by obtaining the historical minimal saturation $S_{wi}$ and the current saturation $S_w$; then for certain values above a tolerance, computing the nth guess, which may include computing the sample saturation value on the drainage curve $s_w^{drn}$, the sample saturation value on the imbibition curve $s_w^{imb}$ and isomorphism map α. The isomorphism map α may be a weighted function between 0 and 1, and the corresponding saturation Sw(n) is a convex combination of the saturation from the drainage curve $S_w^{drn}(f^{(n)})$ and the saturation from the imbibition curve $S_w^{imb}(f^{(n)})$. This nth guess calculation may be repeated for additional values of n. As a specific example, the algorithm may be given as follow:

Data: $s_w$, $s_{wi}$
Result: scanning curve value $f(s_w)$
$s^{(0)} = 0$, $f^{(0)}$ and n = 1;
while $|s^{(n-1)} - s_w|$ > tolerance do
    compute the n-th guess $f^{(n)}$ based on $f^{(n-1)}$;
    compute $s_w^{drn}(f^{(n)})$ such that $f^{drn}(s_w^{drn}) = f^{(n)}$ where $f^{drn}$ is the drainage curve can the connector;
    compute $s_w^{imb}(f^{(n)})$ such that $f^{imb}(s_w^{imb}) = f^{(n)}$ where $f^{imb}$ is the -continued

```
| imbibition curve can the connector;
| compute α(f^(n), s_wi) where α(f^(n), s_wi) is in between (0, 1);
| s_w^(n) = α(f^(n), s_wi)(s_w^drn(f^(n)) - s_w^imb(f^(n))) + s_w^imb(f^(n));
| n = n + 1
end
f(s_w) = f^(n-1);
``` where $f^{drn}$ is the drainage curve of the connector, $s_w^{drn}$ is sampled water saturation on the drainage curve, $s_w^{imb}$ is sampled water saturation on the imbibition curve, $f^{imb}$ is imbibition curve of the connector, n is number of the guess.

The IIA involves a nonlinear solve to obtain the scanning curve value at a given current saturation $S_w$. The algorithm provides the convergence of the nonlinear solve with the assumption that bounding curves are monotonic function. The scanning curves generated using the IIA satisfy the criteria because the isomorphism map uniquely determines the path of the scanning curve corresponding to each historical extreme saturation. Each of the scanning curves are bounded by the bounding curves because they are generated by taking the convex combination of the values at the imbibition and drainage curves.

Beneficially, the present techniques address capillary pressure and relative permeability hysteresis and do not involve solving the constitutive equations to obtain the convex combination. Further, the unified isomorphism framework for generating the scanning curves provides a mechanism to integrate algorithms directly into reservoir simulators. As a result, the present techniques mathematically manages the solutions to satisfy the physical requirements of the scanning curves. Thus, the present techniques provide a method to calculate scanning curve values of the relative permeability and capillary pressure at arbitrary saturation for the reservoir simulator to model hysteresis.

Accordingly, the present techniques may enhance the generation of subsurface models. For example, in one or more embodiments, a method for generating a subsurface model for a subsurface region is described. In one configuration, a method for enhancing hydrocarbon operations for a subsurface region is described. The method comprises: obtaining a subsurface model associated with a subsurface region, wherein the subsurface model comprises a plurality of mesh elements; obtaining bounding curves for one or more of plurality of mesh elements; generating one or more isomorphic reversible scanning curves for the one or more of plurality of mesh elements; simulating fluid flow within the subsurface model, wherein the one or more isomorphic reversible scanning curves are used in the simulation to model fluid heuristics and displacement; and outputting results from the simulation of the subsurface model.

In one or more configurations, the method may include one or more enhancements. The method may include that the isomorphic reversible scanning curve provides a unique scanning curve value at each saturation; wherein the isomorphic reversible scanning curve has a substantially similar shape to the bounding curves; wherein the isomorphic reversible scanning curve does not exceed the bounding curve for each scanning curve value at each saturation; further comprising generating one or more isomorphic reversible scanning curves comprises computing the Isomorphic Algorithm (IA) set forth in the following:

$$kr^{scan}(s_w,s_{wi}) = \alpha(s_w,s_{wi})(kr^{drn}(s_w^{drn}(s_w,s_{wi})) - kr^{imb}(s_w^{imb}(s_w,s_{wi}))) + kr^{imb}(s_w^{imb}(s_w,s_{wi}))$$

where $\alpha(s_w, s_{wi})$ is a weight function that has a value in the range between 0 and 1, $s_w^{drn}(s_w, s_{wi})$ is the sample saturation value on drainage curve and has a function value in a range between $s_w$ and $k_r^{drn-1}(k_r^{imb}(s_w))$, $s_w^{imb}(s_w, s_{wi})$ is the sample saturation value on the imbibition curve and has a function value in a range between $s_w$ and $k_r^{imb}(k_r^{drn}(s_w))$, $kr^{scan}$ is the relative permeability, $kr^{drn}$ is the drainage curve, krimb is the imbibition curve, swi is the historical minimal water saturation and sw is the current saturation; wherein generating one or more isomorphic reversible scanning curves comprises computing the Forward Isomorphic Algorithm (FIA) set forth in the following:

$$kr^{scan}(s_w, s_{wi}) =$$
$$\begin{cases} \alpha(s_w, s_{wi})(kr^{imb}(s_w) - kr^{drn}(s_w)) + kr^{drn}(s_w) & \text{for all } s_{wi} < s_w \leq 1 - s_{orw} \\ \alpha(s_w, s_{wi})(kr^{conn}(s_w) - kr^{drn}(s_w)) + kr^{drn}(s_w) & \text{for all } 1 - s_{orw} < s_w \leq 1 - s_{or} \end{cases}$$

with $$\alpha(s_w, s_{wi}) = \begin{cases} \dfrac{s_w - s_{wi}}{s_w - s_{wir}} & \text{for all } s_{wi} < s_w \leq 1 - s_{orw} \\ \dfrac{s_w - s_{wi}}{s_w - s_{wi}^*(s_w)} & \text{for all } 1 - s_{orw} < s_w \leq 1 - s_{or} \end{cases}$$

where $\alpha(s_w, s_{wi})$ is a weight function that has a value in the range between 0 and 1, s*wi is the historical minimal saturation corresponding to the saturation $S_w$ on the connector curve, krscan is the relative permeability, $k_r^{conn}$ is a connector curve, krdrn is the drainage curve, krimb is the imbibition curve, $s_{wi}$ is the historical minimal water saturation, $s_{orw}$ is the residual oil saturation after water flood, $s_{or}$ is a residual oil saturation and $s_w$ is the current saturation; wherein generating one or more isomorphic reversible scanning curves comprises computing the Convex Isomorphic Algorithm (CIA) set forth in the following:

$$p_c^{scan}(s_w,s_{wi}) = \beta(s_{wi})(p_c^{drn}(s_w) - p_c^{imb-ssi}(s_w,s_{wi})) + p_c^{imb-ssi}(s_w,s_{wi})$$

where $p_c^{imb-ssi}(s_w, s_{wi})$ is obtained using the shift and scale isomorphism and $$\beta(s_{wi}) = \frac{p_c^{scan}(1 - s_{or}(s_{wi})) - p_c^{imb}(1 - s_{orw})}{p_c^{drn}(1 - s_{or}(s_{wi})) - p_c^{imb}(1 - s_{orw})}$$

where pcscan is a scanning curve, $k_r^{conn}$ is a connector curve, pcdrn is drainage curve, pcimb is imbibition curve, $\beta$ is a ratio of sampling from drainage curve, $s_{wi}$ is the historical minimal water saturation, $s_{orw}$ is the residual oil saturation after water flood, $s_{or}$ is a residual oil saturation and $s_w$ is the current saturation, wherein generating one or more isomorphic reversible scanning curves comprises computing the Scale and Shift Isomorphic Algorithm (SSIA) set forth in the following:

$$kr^{scan}(s_w, s_{wi}) = \begin{cases} kr^{imb}(\alpha(s_w, s_{wi})^p(s_w - s_{imb}(s_w)) + s_{imb}(s_w)) & \text{for all } s_{wi} < s_w \leq 1 - s_{orw} \\ kr^{imb}(\alpha(s_w, s_{wi})^p((1 - s_{orw}) - s_{imb}(s_w)) + s_{imb}(s_w)) & \text{for all } 1 - s_{orw} < s_w \leq 1 - s_{or} \end{cases}$$

with

-continued $$\alpha(s_w, s_{wi}) = \begin{cases} \dfrac{s_w - s_{wi}}{s_w - s_{wir}} & \text{for all } s_{wi} < s_w \le 1 - s_{orw} \\ \dfrac{s_w - s_{wi}}{s_w - s_{wi}^*(s_w)} & \text{for all } 1 - s_{orw} < s_w \le 1 - s_{or} \end{cases}$$

and $$s_{imb} = kr^{imb^{-1}}(kr^{drn}(s_w))$$

where $\alpha(s_w, s_{wi})$ is a weight function that has a value in the range between 0 and 1, s*wi is the historical minimal saturation corresponding to the saturation $S_w$ on the connector curve, krscan is the relative permeability, krdm is the drainage curve, krimb is the imbibition curve, swi is the historical minimal water saturation, sorw is the residual oil saturation after water flood, sor is a residual oil saturation and sw is the current saturation; wherein generating one or more isomorphic reversible scanning curves comprises computing an Inverse Isomorphic Algorithm (IIA) by solving a nonlinear expression to obtain a scanning curve value at a given current saturation Sw, wherein the bounding curves are monotonic functions; further comprising causing a well to be drilled based on the output results; comprising performing a hydrocarbon operation based on the results from the simulation of the subsurface model; and/or wherein the outputting the results from the simulation comprise displaying time-varying fluid pressures and fluid compositions.

In another configuration, a system for generating a subsurface model associated with a subsurface region is described. The system comprises: a processor; an input device in communication with the processor and configured to receive input data associated with a subsurface region; memory in communication with the processor, the memory having a set of instructions, wherein the set of instructions, when executed by the processor, are configured to: obtain a subsurface model associated with a subsurface region, wherein the subsurface model comprises a plurality of mesh elements; obtain bounding curves for one or more of plurality of mesh elements; generate one or more isomorphic reversible scanning curves for the one or more of plurality of mesh elements; simulate fluid flow within the subsurface model, wherein the one or more isomorphic reversible scanning curves are used in the simulation to model fluid heuristics and displacement; and output results from the simulation of the subsurface model.

In one or more configurations, the system may include one or more enhancements. The system may comprise wherein the isomorphic reversible scanning curve provides a unique scanning curve value at each saturation; wherein the isomorphic reversible scanning curve has a substantially similar shape to the bounding curves; wherein the isomorphic reversible scanning curve does not exceed the bounding curve for each scanning curve value at each saturation; wherein the set of instructions, when executed by the processor, are further configured to: generate one or more isomorphic reversible scanning curves comprises computing the Isomorphic Algorithm (IA) set forth in the following:

$$kr^{scan}(s_w, s_{wi}) = \alpha(s_w, s_{wi})(kr^{drn}(s_w^{drn}(s_w, s_{wi})) - kr^{imb}(s_w^{imb}(s_w, s_{wi}))) + kr^{imb}(s_w^{imb}(s_w, s_{wi}))$$

where $\alpha(s_w, s_{wi})$ is a weight function that has a value in the range between 0 and 1, $s_w^{drn}(s_w, s_{wi})$ is the sample saturation value on drainage curve and has a function value in a range between $s_w$ and $k_r^{drn^{-1}}(k_r^{imb}(s_w))$; $s_w^{imb}(s_w, s_{wi})$ is the sample saturation value on the imbibition curve and has a function value in a range between $s_w$ and $k_r^{imb^{-1}}(k_r^{drn}(s_w))$, krscan is the relative permeability, krdrn is the drainage curve, krimb is the imbibition curve, swi is the historical minimal water saturation and sw is the current saturation; wherein the set of instructions, when executed by the processor, are further configured to: generate one or more isomorphic reversible scanning curves comprises computing the Forward Isomorphic Algorithm (FIA) set forth in the following:

$$kr^{scan}(s_w, s_{wi}) = \begin{cases} \alpha(s_w, s_{wi})(kr^{imb}(s_w) - kr^{drn}(s_w)) + kr^{drn}(s_w) & \text{for all } s_{wi} < s_w \le 1 - s_{orw} \\ \alpha(s_w, s_{wi})(kr^{conn}(s_w) - kr^{drn}(s_w)) + kr^{drn}(s_w) & \text{for all } 1 - s_{orw} < s_w \le 1 - s_{or} \end{cases}$$

with $$\alpha(s_w, s_{wi}) = \begin{cases} \dfrac{s_w - s_{wi}}{s_w - s_{wir}} & \text{for all } s_{wi} < s_w \le 1 - s_{orw} \\ \dfrac{s_w - s_{wi}}{s_w - s_{wi}^*(s_w)} & \text{for all } 1 - s_{orw} < s_w \le 1 - s_{or} \end{cases}$$

where $\alpha(s_w, s_{wi})$ is a weight function that has a value in the range between 0 and 1, s*wi is the historical minimal saturation corresponding to the saturation Sw on the connector curve, krscan is the relative permeability, krconn is a connector curve, krdrn is the drainage curve, krimb is the imbibition curve, swi is the historical minimal water saturation, sorw is the residual oil saturation after water flood, sor is a residual oil saturation and sw is the current saturation; wherein the set of instructions, when executed by the processor, are further configured to: generate one or more isomorphic reversible scanning curves comprises computing the Convex Isomorphic Algorithm (CIA) set forth in the following:

$$p_c^{scan}(s_w, s_{wi}) = \beta(s_{wi})(p_c^{drn}(s_w) - p_c^{imb\text{-}ssi}(s_w, s_{wi})) + p_c^{imb\text{-}ssi}(s_w, s_{wi})$$

where $p_c^{imb\text{-}ssi}(s_w, s_{wi})$ is obtained using the shift and scale isomorphism and $$\beta(s_{wi}) = \frac{p_c^{scan}(1 - s_{or}(s_{wi})) - p_c^{imb}(1 - s_{orw})}{p_c^{drn}(1 - s_{or}(s_{wi})) - p_c^{imb}(1 - s_{orw})}$$

where pcscan is scanning curve, krconn is a connector curve, pcdrn is drainage curve, pcimb is imbibition curve, swi is the historical minimal water saturation, sorw is the residual oil saturation after water flood, sor is a residual oil saturation and sw is the current saturation; wherein the set of instructions, when executed by the processor, are further configured to: generate one or more isomorphic reversible scanning curves comprises computing the Scale and Shift Isomorphic Algorithm (SSIA) set forth in the following:

$$kr^{scan}(s_w, s_{wi}) = \begin{cases} kr^{imb}(\alpha(s_w, s_{wi})^p(s_w - s_{imb}(s_w)) + s_{imb}(s_w)) \text{ for all } s_{wi} < s_w \leq 1 - s_{orw} \\ kr^{imb}(\alpha(s_w, s_{wi})^p((1 - s_{orw}) - s_{imb}(s_w)) + s_{imb}(s_w)) \text{ for all } 1 - s_{orw} < s_w \leq 1 - s_{or} \end{cases}$$

with $$\alpha(s_w, s_{wi}) = \begin{cases} \dfrac{s_w - s_{wi}}{s_w - s_{wir}} \text{ for all } s_{wi} < s_w \leq 1 - s_{orw} \\ \dfrac{s_w - s_{wi}}{s_w - s^*_{wi}(s_w)} \text{ for all } 1 - s_{orw} < s_w \leq 1 - s_{or} \end{cases} \text{ and } s_{imb} = kr^{imb-1}(kr^{drn}(s_w))$$

where $\alpha(s_w, s_{wi})$ is a weight function that has a value in the range between 0 and 1, s*wi is the historical minimal saturation corresponding to the saturation Sw on the connector curve, krscan is the relative permeability, krdrn is the drainage curve, krimb is the imbibition curve, swi is the historical minimal water saturation, sorw is the residual oil saturation after water flood, sor is a residual oil saturation and sw is the current saturation; wherein the set of instructions, when executed by the processor, are further configured to: generate one or more isomorphic reversible scanning curves comprises computing an Inverse Isomorphic Algorithm (IIA) by solving a nonlinear expression to obtain a scanning curve value at a given current saturation Sw, wherein the bounding curves are monotonic functions.

Beneficially, the present techniques provide various enhancements to the hydrocarbon operations. The isomorphic reversible scanning curves generation algorithm does not involve user-specified interpolation parameters and does not involve user conduct quality control prior to the simulation. Accordingly, the present techniques may be used to perform reservoir simulations with less computational effort, with less intervention of users, and in a shorter time period. The present techniques may be further understood with reference to FIGS. 1 to 16, which are described further below.

FIG. 1 is an exemplary flow chart 100 in accordance with an embodiment of the present techniques. The flow chart 100 includes a method for creating subsurface models that enhance the generation of isomorphic reversible scanning curve for simulating hysteresis in reservoir simulators. The method may include constructing a subsurface model for a subsurface region and using the subsurface model in simulations and in hydrocarbon operations, such as hydrocarbon exploration, hydrocarbon development, and/or hydrocarbon production. The method may include obtaining a subsurface model and other historical data, as shown in blocks 102 to 106. Then, isomorphic reversible scanning curves are generated and used to prepare the subsurface model for simulation, as shown in blocks 108 to 114, and the isomorphic reversible scanning curves are used to perform simulations and for hydrocarbon operations, as shown in blocks 116 and 120.

To begin, the method involves obtaining a subsurface model and other historical data for the subsurface region, as shown in blocks 102 to 106. At block 102, a subsurface model is obtained for the subsurface region. The subsurface model may be created based on measurement data or accessed from memory. The measurement data may include seismic data, resistivity data, gravity data, well log data, core sample data, and combinations thereof. The subsurface model may include geologic features, such as horizons and faults. By way of example, the creation of the subsurface model may include forming a structural framework of objects (e.g., surfaces, such as faults, horizons, and if necessary, additional surfaces that bound the area of interest for the model), verifying or forming the objects into closed volumes, meshing or partitioning the volume into sub-volumes (e.g., cells, mesh elements or voxels) defined by a mesh (e.g., a 3-D mesh or 3-D grid), and assigning properties to the mesh elements. The properties may include properties of the subsurface and associated fluids, such as transmissibility, rock type, porosity and/or permeability. At block 104, the initial historical fluid data may be obtained. The historical fluid data may include historical saturation values. At block 106, the bounding curves for mesh element within the subsurface model may be obtained. The bounding curves may be generated or may be obtain from memory. The bounding curves may be the bounding imbibition curve and the drainage curve for the respective mesh elements. Further, the boundary curves may be determined through measurements of core samples in a laboratory experiment.

Once the subsurface model and data are obtained, the isomorphic reversible scanning curves are generated and used to prepare the subsurface model for simulation, as shown in blocks 108 to 114. In block 108, isomorphic reversible scanning curves are generated. The generation of the isomorphic reversible scanning curves may involve computing with one or more parameter-free isomorphic scanning curve generation algorithms the reversible isomorphic scanning curves for the mesh elements. As noted above and further described below, the parameter-free isomorphic scanning curve generation algorithms may be represented as an Isomorphic Algorithm (IA). The IA may be constructed into different parameter-free isomorphic scanning curve generation algorithms based on the selection of different functions, such as Forward Isomorphic Algorithm (FIA), Scale and Shift Isomorphic Algorithm (SSIA), Convex Isomorphic Algorithm (CIA) and/or Inverse Isomorphic Algorithm (IIA), as examples. At block 110, the heuristics may be modelled using the isomorphic reversible scanning curves. Then, a determination is made whether the generation is complete, as shown in block 112. If the generation is not complete, the historical fluid data is updated, as shown in block 114. The updating of the historical fluid data may include updating the production data from concurrent hydrocarbon operations and/or may include historical saturation data (e.g., historical extreme saturation data). Then, the process may generate isomorphic reversible scanning curves, as shown in block 108.

If the generation is complete, the isomorphic reversible scanning curves are used to perform simulations and for hydrocarbon operations, as shown in blocks 116 and 120. At block 116, a simulation may be performed based on the isomorphic reversible scanning curves. The simulation may be performed with the subsurface model, which may have the isomorphic reversible scanning curves and/or heuristics incorporated into the respective mesh elements of the subsurface models. The subsurface model may be a reservoir model or a geologic model and may be utilized to provide simulation results. Performing the simulation may include modeling fluid flow based on the reservoir model and the associated properties stored within the cells of the reservoir model. The simulation results may include the computation of time-varying fluid pressure and fluid compositions (e.g., oil, water, and gas saturation) and the prediction of fluid volumes produced or injected at wells. Performing the simulation may also include modeling fluid and/or structural changes based on the subsurface model and the associated properties stored within the mesh elements of the subsurface model.

Figure 17:
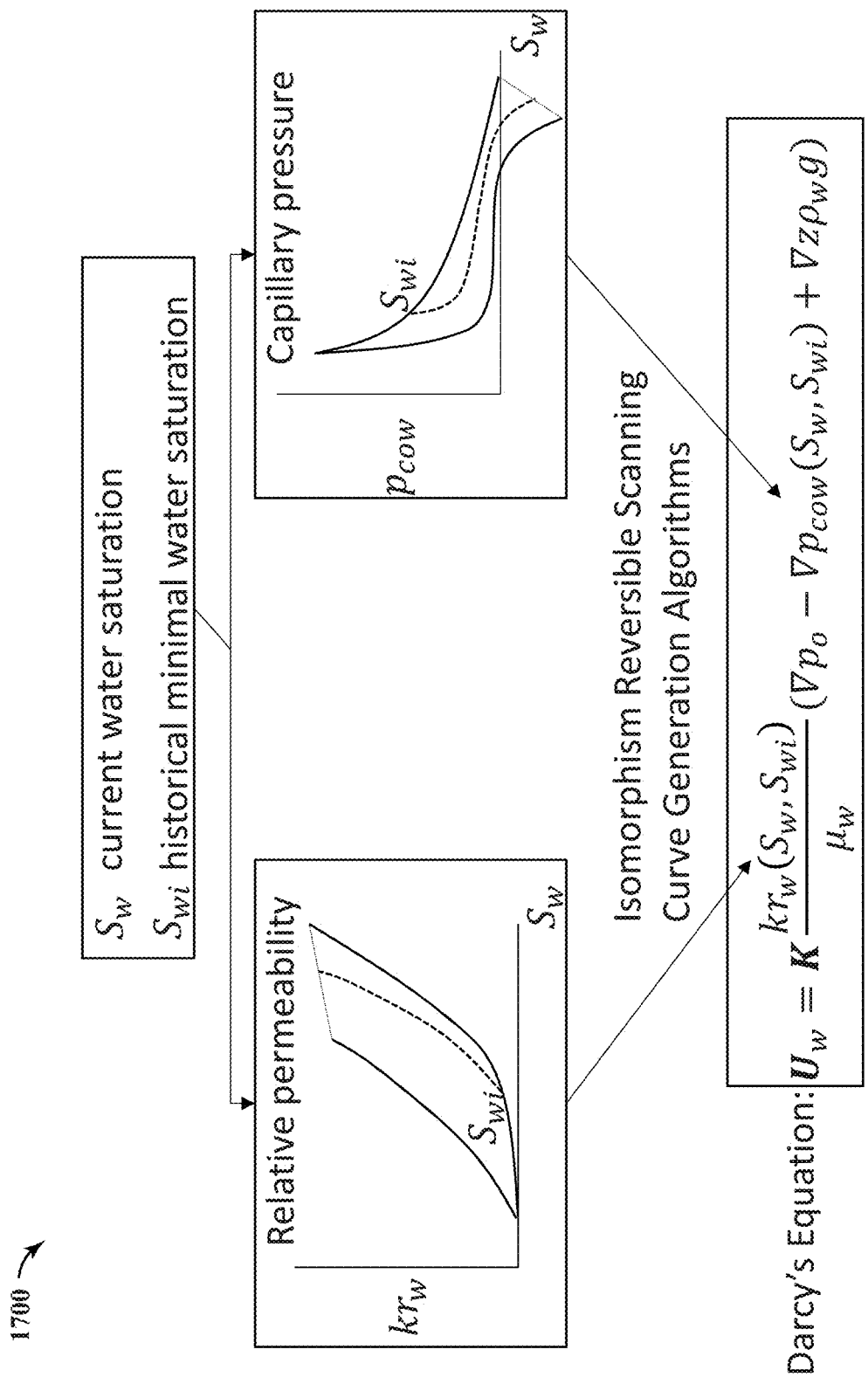
FIG. 17 is a diagram illustrating how the scanning curves can be used to generate coefficients for fluid flow equations.

In one or more embodiments, the isomorphic reversible scanning curves may be used to perform fluid flow simulations for hydrocarbon operations. For examples, as illustrated in diagram 1700 of FIG. 17 the isomorphic reversible scanning curves may be used as coefficients for Darcy's equation to determine fluid flow in the subsurface. As seen in FIG. 17, $U_w$ is the water rate, K is absolute permeability, $\mu_w$ is water viscosity, $p_o$ is oil pressure, z is depth, $\rho_w$ is water density, and g is the gravitational constant. Thus, the as seen in FIG. 17 the isomorphic reversible scanning curves can be used to generate the coefficients for relative permeability and capillary pressure (using the current water saturation $S_w$ and historical minimal water saturation $S_{wi}$ as described above) in Darcy's equation to model and simulate the fluid flow rate in the subsurface.

Returning to FIG. 1 at block 118, the results may be output. The outputting of the results may include displaying the results on a monitor and/or storing the results in memory of a computer system. The results may include the simulation results, which may include the subsurface model being simulated at each time step or the generated data at each time step, the isomorphic reversible scanning curves and/or heuristics. At block 120, the results, such as simulation results, may be utilized to perform hydrocarbon operations. The hydrocarbon operations may include hydrocarbon exploration operations, hydrocarbon development operations, and/or hydrocarbon production operations. For example, the simulation results and/or the reservoir model may be used to estimate or adjust reserves forecasts, reserves estimations, and/or well performance prediction. As another example, the simulation results and/or the reservoir model may be used to adjust hydrocarbon production operations, such as installing or modifying a well or completion, modifying or adjusting drilling operations and/or installing or modifying a production facility. Further, the results may be utilized to predict hydrocarbon accumulation within the subsurface region; to provide an estimated recovery factor; and/or to determine rates of fluid flow for a subsurface region. The production facility may include one or more units to process and manage the flow of production fluids, such as hydrocarbons and/or water, from the formation.

Beneficially, this method provides an enhancement in the production, development, and/or exploration of hydrocarbons. In particular, the method may be utilized to enhance development of subsurface models that properly characterize fluid flow. Further, the results may provide an enhanced subsurface model with less computational effort, less interactive intervention, and/or in a computationally efficient manner. As a result, this may provide enhancements to production at lower costs and lower risk.

As may be appreciated, the blocks of FIG. 1 may be omitted, repeated, performed in a different order, or augmented with additional steps not shown. Some steps may be performed sequentially, while others may be executed simultaneously or concurrently in parallel.

In one or more embodiments, the process described in FIG. 1 may have further enhancements. For example, after the initial simulation is completed, the process may be restarted with different bounding curves. That is, the scanning curves may be generated using alternate bounding curves. For example, a user may desire to modify the bounding curves based on new production data that was collected that indicates changes in rock wettability. That is, after various hydrocarbon production operations have taken place, such as surfactant injections or other enhanced oil recovery methods, the wettability of the rock in the subsurface may be altered. In such instances, it may be desirable to modify the bounding curves and then generate new scanning curves based on the modified bounding curves.

In one or more embodiments, the methods and systems describe herein may also comprise generating an uncertainty associated with the input curves and/or bounding curves. In such a manner, a user may generate an uncertainty associated with the model and simulations.

As noted in FIG. 1, the isomorphic reversible scanning curves may be generated in block 108 and used in performing the reservoir simulation in block 116. By way of example, the isomorphic reversible scanning curves may model the effect of history-dependent trapping of the wetting phase by the non-wetting phase in the transition zone known as hysteresis. The reversible scanning curves may be constructed between the imbibition and drainage curves based on the historical minimal water saturation $S_{wi}$ for water relative permeability $K_{rw}$, oil relative permeability in relation to water $K_{row}$ and water-oil capillary pressure $P_{cow}$ and historical maximal gas saturation $S_{gi}$ for gas relative permeability $K_{rg}$, oil relative permeability in relation to gas $K_{rog}$ and gas-oil relative permeability $P_{cgo}$. An example of this is shown in FIG. 2.

Figure 2:
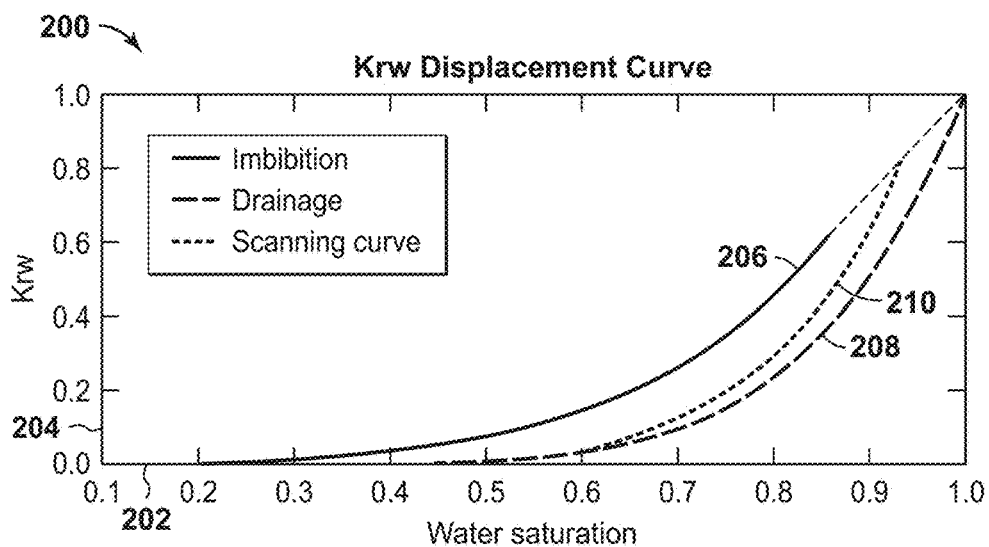
FIG. 2 is an exemplary graph of a displacement curve.

For instance, FIG. 2 is an exemplary graph 200 of a displacement curve. This graph 200 represents the displacement curve of water relative permeability $K_{rw}$, which includes the imbibition curve 206, drainage curve 208 and scanning curve shown along the water saturation axis 202 and the water relative permeability $K_{rw}$ axis 204. As shown in FIG. 2, the scanning curve 210 starts at a historical minimal water saturation $S_{wi}$ on the drainage curve and is disposed between the imbibition curve 206 and drainage curve 208. Each historical minimal water saturation $S_{wi}$ corresponds to a unique scanning curve and should not intersect with the scanning curves corresponding to different historical minimal water saturation. Accordingly, as the value of the historical minimal water saturation $S_{wi}$ approaches the irreducible water saturation $S_{wir}$, the values of the scanning curve 210 closely resemble the values of the imbibition curve 206. In addition to water relative permeability $K_{rw}$, as shown in FIG. 2, oil relative permeability in relation to water $K_{row}$ and water-oil capillary pressure $P_{cow}$ also have similar curves respectively.

Alternatively, as noted above, instead of depending on historical minimal water saturation, gas relative permeability $K_{rg}$, oil relative permeability in relation to gas $K_{rog}$ and gas-oil relative permeability $P_{cgo}$ depend on the historical maximal gas saturation $S_{gi}$. Accordingly, these parameters resemble the shape of the imbibition curve when historical maximal gas saturation $S_{gi}$ reaches one minus irreducible water saturation ($1-S_{wir}$) for oil relative permeability in relation to gas $K_{rog}$ and $P_{cgo}$ and $1-S_{wir}-S_{org}$ for gas relative permeability $K_{rg}$.

Accordingly, the scanning curves may follow the following criteria: (i) all scanning curves should be between the bounding imbibition and drainage curves; (ii) any two scanning curves with different historical extreme saturation should not overlap; (iii) each scanning curve should take on the value of the drainage curve at historical minimum water saturation $S_{wi}$ and the specified connector curve at $1-S_{or}$; and (iv) as the limit of historical minimum water saturation $S_{wi}$ approaches irreducible water saturation $S_{wir}$, the scanning curves should become the bounding imbibition curve.

Figure 3:
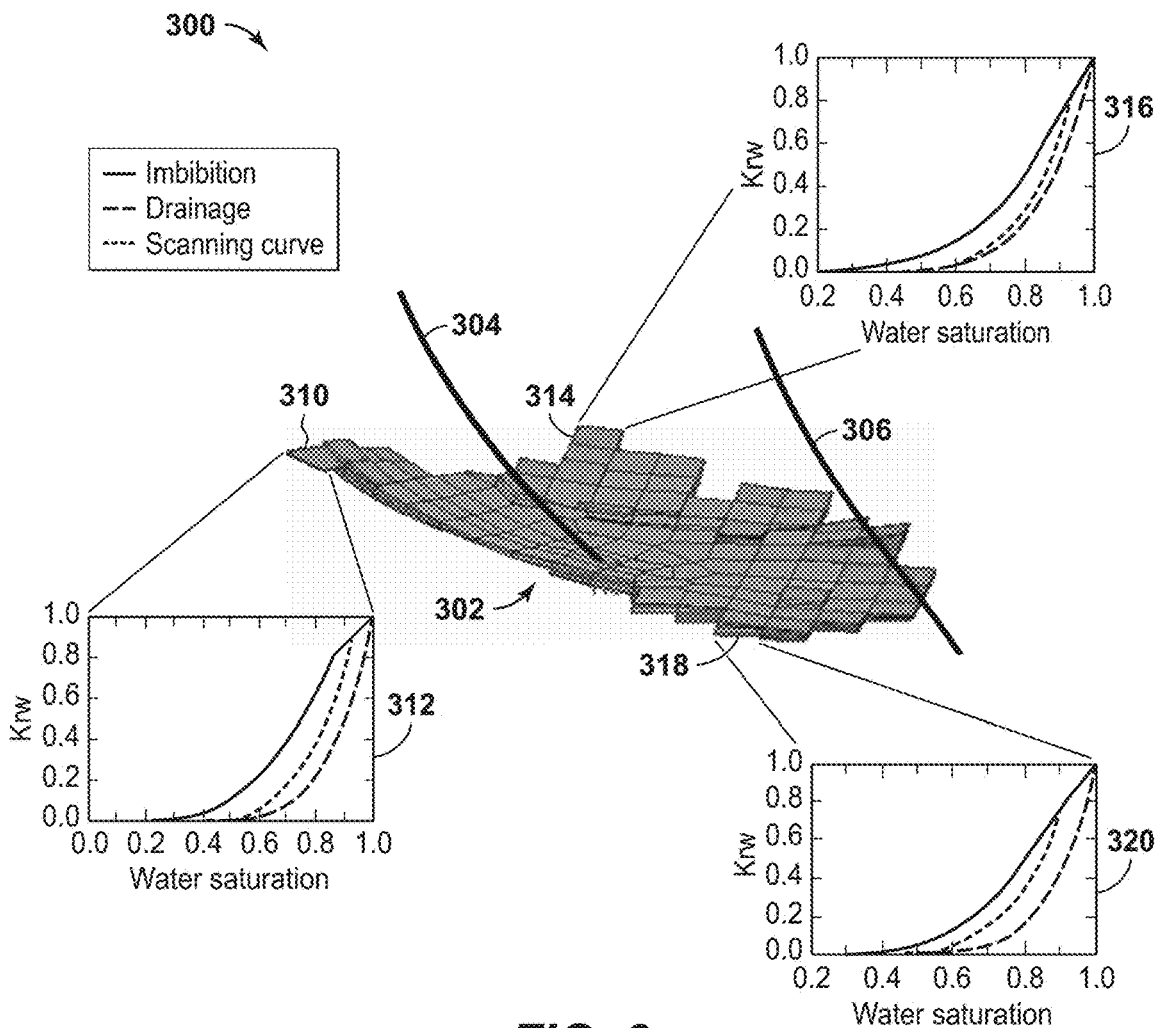
FIG. 3 is an exemplary diagram of a reservoir model with different displacement curves and scanning curves associated with different mesh elements.

FIG. 3 is an exemplary diagram 300 of a reservoir model 302 with different displacement curves and scanning curves associated with different mesh elements, such as mesh elements 310, 314 and 318. The diagram 300 includes wells, such as wells 304 and 306. Each of the mesh elements, such as mesh elements 310, 314 and 318, are associated with one or more charts of displacement curves, such as charts 312, 316 and 320 (e.g., which may include a water relative permeability $K_{rw}$ axis and water saturation axis). Each of these charts may include reversible scanning curves that may be distinct mesh element-by-mesh element and region-by-region and are therefore constructed mesh element-by-mesh element and evaluated during the simulation as part of the property calculations, as illustrated in FIG. 4.

Figure 4:
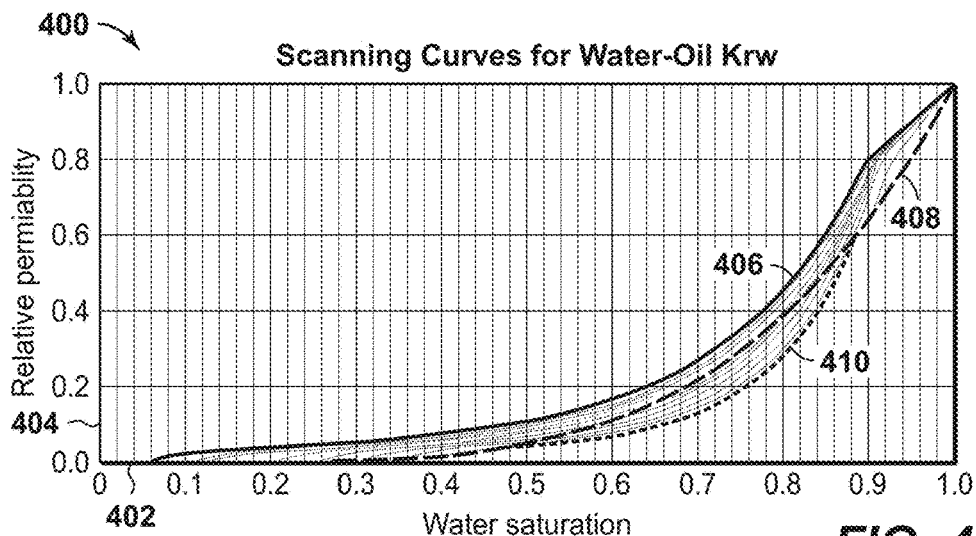
FIG. 4 is an exemplary graph of an unphysical reversible scanning curve.

FIG. 4 is an exemplary graph 400 of an unphysical reversible scanning curve. The graph 400 the unphysical reversible scanning curve of water relative permeability $K_{rw}$ is shown for different scanning curves, such as scanning curves 410 (e.g., scanning curves are dashed lines), and bounding curves, such as imbibition curve 406 and drainage curve 408 (e.g., bounding curves are solid lines). The curves are shown along the relative permeability axis 404 and water saturation axis 402. In contrast to conventional scanning curve generation approaches, which are limited with the imbibition and drainage curves being obtained as table input, the present techniques provide scanning curves of water relative permeability $K_{rw}$, such as scanning curve 410, which may cross the bounding curves.

To resolve the non-physicality of the reversible scanning curve, the present techniques use parameter-free isomorphic scanning curve generation algorithms to generate reversible scanning curves for reservoir simulations. The selection of the functions may be used in the IA to create different algorithms, such as FIA, SSIA, CIA and/or IIA, as examples.

As a first configuration, the FIA may be used to generate the scanning curves for water relative permeability $K_{rw}$ and oil relative permeability in relation to gas $K_{rog}$. This algorithm, as noted above, may be defined as follow in equations (e2) and (e3):

$$kr^{scan}(s_w, s_{wi}) = \begin{cases} \alpha(s_w, s_{wi})(kr^{imb}(s_w) - kr^{dm}(s_w)) + kr^{dm}(s_w) & \text{for all } s_{wi} < s_w \leq 1 - s_{orw} \\ \alpha(s_w, s_{wi})(kr^{conn}(s_w) - kr^{dm}(s_w)) + kr^{dm}(s_w) & \text{for all } 1 - s_{orw} < s_w \leq 1 - s_{or} \end{cases} \quad (e2)$$

with $$\alpha(s_w, s_{wi}) = \begin{cases} \dfrac{s_w - s_{wi}}{s_w - s_{wir}} & \text{for all } s_{wi} < s_w \leq 1 - s_{orw} \\ \dfrac{s_w - s_{wi}}{s_w - s^*_{wi}(s_w)} & \text{for all } 1 - s_{orw} < s_w \leq 1 - s_{or} \end{cases} \quad (e3)$$

The map $\alpha$ is an isomorphism map that associates the historical minimal saturation prior to the current saturation $S_w$ to the percentage of the imbibition function value. The $S^*_{wi}$ is function that associates the current saturation $S_w$ between one minus residual oil saturation after water flood $1-S_{orw}$ and one minus $1-S_{or}$ to the corresponding historical extreme saturation $S^*_{wi}$. A graphical example of the forward isomorphic scanning curve construction is shown in FIGS. 5 and 6.

Figure 5:
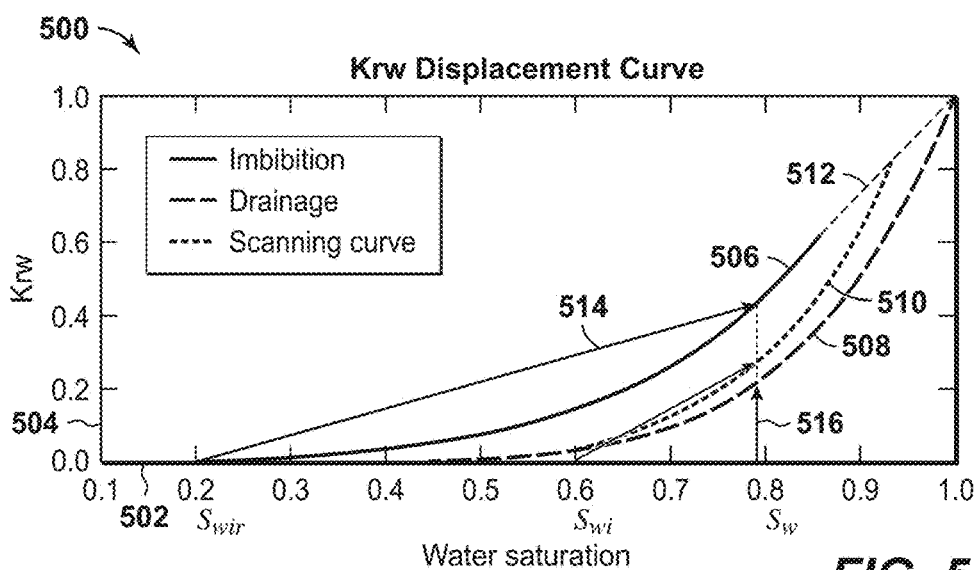
FIG. 5 is an exemplary graph of scanning curve generation for a current saturation ($S_w$) between irreducible water saturation ($S_{wir}$) and one minus the residual oil saturation after a water flood (1-$S_{orw}$).

FIG. 5 is an exemplary graph 500 of scanning curve generation for $S_w$ between irreducible water saturation $S_{wir}$ and one minus residual oil saturation after water flood $1-S_{orw}$. This graph 500 is used to illustrate how the FIA works when evaluating $K_{rw}$ scanning curve at water saturation ($S_w$) equal to 0.79 with historical minimum water saturation ($S_{wi}$) is equal 0.6. The graph 500 represents the displacement curve of water relative permeability $K_{rw}$, which includes the imbibition curve 506, drainage curve 508 and scanning curve shown along the water saturation ($S_w$) axis 502 and the water relative permeability $K_{rw}$ axis 504. As shown in FIG. 5, the scanning curve 510 starts at a historical minimal water saturation $S_{wi}$ on the drainage curve 508 and is disposed between the imbibition curve 506 and drainage curve 508. Each value of $S_w$ along the scanning curve 510 is bounded within the imbibition curve 506 (e.g., as shown by point of intersection of line 514 and the imbibition curve 506) and the drainage curve 508 (e.g., as shown by point of intersection of line 516 and the drainage curve 508).

Figure 6:
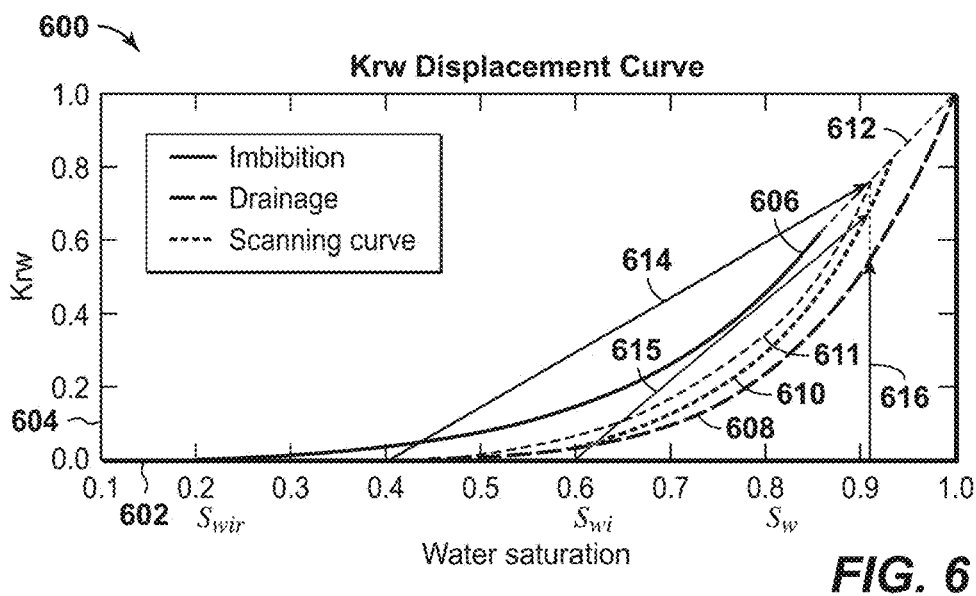
FIG. 6 is an exemplary graph of scanning curve generation for a current saturation ($S_w$) between one minus the residual oil saturation after water flood (1-$S_{orw}$) and one minus the critical oil saturation (1-$S_{oc}$).

FIG. 6 is an exemplary graph 600 of scanning curve generation for the current saturation $S_w$ between one minus residual oil saturation after water flood $1-S_{orw}$ and one minus the critical oil saturation $1-S_{oc}$. This graph 500 is used to illustrate how the FIA works when evaluating $K_{rw}$ scanning curve when water saturation is greater than one minus the residual oil saturation after water flood (e.g., $S_w > 1-S_{orw}$). The graph 600 represents the displacement curve of water relative permeability $K_{rw}$, which includes the imbibition curve 606, drainage curve 608 and scanning curves 610 and 611 shown along the water saturation axis 602 and the water relative permeability $K_{rw}$ axis 604. As shown in FIG. 6, the scanning curve 610 starts at a historical minimal water saturation $S_{wi}$ on the drainage curve 608 and is disposed between the imbibition curve 606 and drainage curve 608, while the scanning curve 611 starts at $S^*_{wi}$ on the drainage curve 608 and is disposed between the imbibition curve 606 and drainage curve 608. Each value of the current saturation $S_w$ along the scanning curves 610 is bounded within the imbibition curve 606 (e.g., as shown by point of intersection of line 615 and the imbibition curve 606) and the drainage curve 608 (e.g., as shown by point of intersection of line 616 and the drainage curve 608). Similarly, each value of current saturation $S_w$ along the scanning curves 611 is bounded within the imbibition curve 606 (e.g., as shown by point of intersection of line 614 and the imbibition curve 606) and the drainage curve 608 (e.g., as shown by point of intersection of line 616 and the drainage curve 608).

As may be appreciated, the isomorphism map α manages the unique convex combination of the drainage and imbibition curve at the current saturation $S_w$. Also we know that α is in between 0 and 1. Therefore, the scanning curves, such as scanning curves 510 of FIG. 5 and scanning curves 610 and 611 of FIG. 6, generated are constrained between the respective bounding curves, such as bounding curves 506 and 508 of FIG. 5 and bounding curves 606 and 608 of FIG. 6.

As a second configuration, SSIA may be used to generate the reversible scanning curves for oil relative permeability in relation to water $K_{row}$, gas relative permeability $K_{rg}$, water-oil capillary pressure $P_{cow}$ and gas-oil relative permeability $P_{cgo}$. As noted above, the algorithm is described as noted above in equations (e4), (e5), and (e6):

$$kr^{scan}(s_w, s_{wi}) = \begin{cases} kr^{imb}(\alpha(s_w, s_{wi})^p(s_w - s_{imb}(s_w)) + s_{imb}(s_w)) \text{ for all } s_{wi} < s_w \le 1 - s_{orw} \\ kr^{imb}(\alpha(s_w, s_{wi})^p((1 - s_{orw}) - s_{imb}(s_w)) + s_{imb}(s_w)) \text{ for all } 1 - s_{orw} < s_w \le 1 - s_{or} \end{cases} \quad (e4)$$

with $$\alpha(s_w, s_{wi}) = \begin{cases} \dfrac{s_w - s_{wi}}{s_w - s_{wir}} \text{ for all } s_{wi} < s_w \le 1 - s_{orw} \\ \dfrac{s_w - s_{wi}}{s_w - s^*_{wi}(s_w)} \text{ for all } 1 - s_{orw} < s_w \le 1 - s_{or} \end{cases} \quad (e5)$$

and $$s_{imb} = kr^{imb-1}(kr^{drn}(s_w)). \quad (e6)$$

The isomorphism map α is the same as the one used in FIA, as noted above. The parameter p≥1 is the power and may be set to the value of 1. The isomorphism map provides a mechanism to provide a unique value for each scanning curve corresponding to a historical extreme saturation. As a result, the convex combination of the saturation manages the scanning curve values to be bounded between the bounding curves for each current saturation $S_w$. The graphical representations of the construction of the scanning curve are provided in FIGS. 6, 7, 8, and 9.

Figure 7:
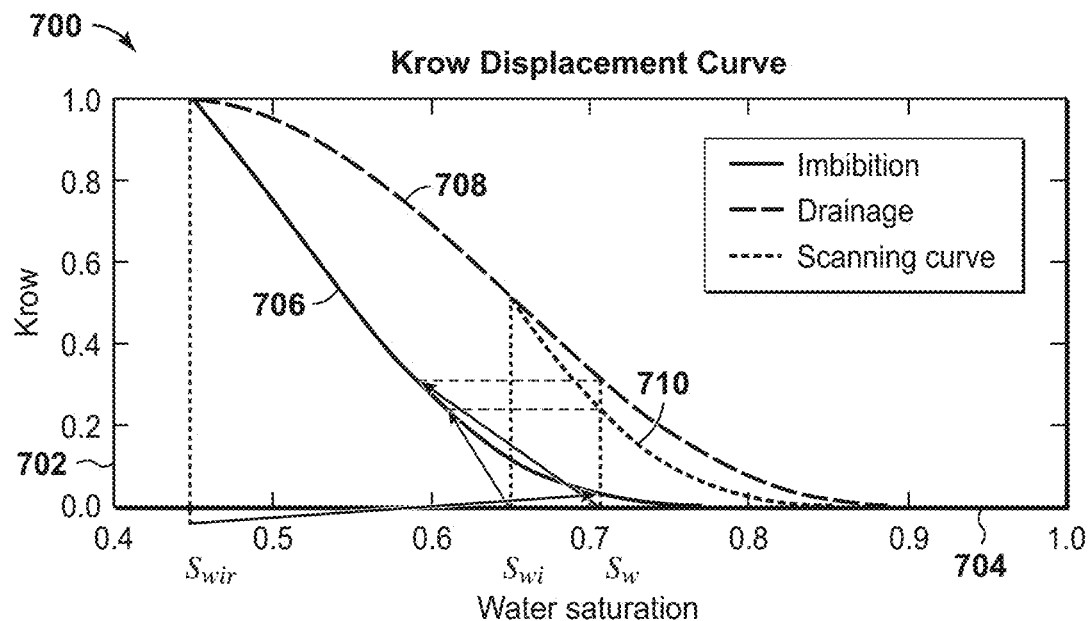
FIG. 7 is an exemplary graph of scanning curve generation for a current saturation ($S_w$) between irreducible water saturation ($S_{wir}$) and one minus the residual oil saturation after water flood (1-$S_{orw}$).

FIG. 7 is an exemplary graph 700 of scanning curve for current saturation $S_w$ between irreducible water saturation $S_{wir}$ and one minus residual oil saturation after water flood 1-$S_{orw}$. This graph 700 is used to illustrate how to evaluate $K_{row}$ scanning curve using SSIA at water saturation ($S_w$) equal to 0.71 with historical minimum water saturation at $S_{wi}$ equal to 0.65. The graph 700 represents the displacement curve of oil relative permeability in relation to water $K_{row}$, which includes the imbibition curve 706, drainage curve 708 and scanning curve 710 shown along the water saturation axis 702 and the oil relative permeability in relation to water $K_{row}$ axis 704. As shown in FIG. 7, the scanning curve 710 starts at a historical minimal water saturation $S_{wi}$ on the drainage curve 708 and is disposed between the imbibition curve 706 and drainage curve 708. Each value of the current saturation $S_w$ along the scanning curve 710 is bounded within the imbibition curve 706 and the drainage curve 708.

Figure 8:
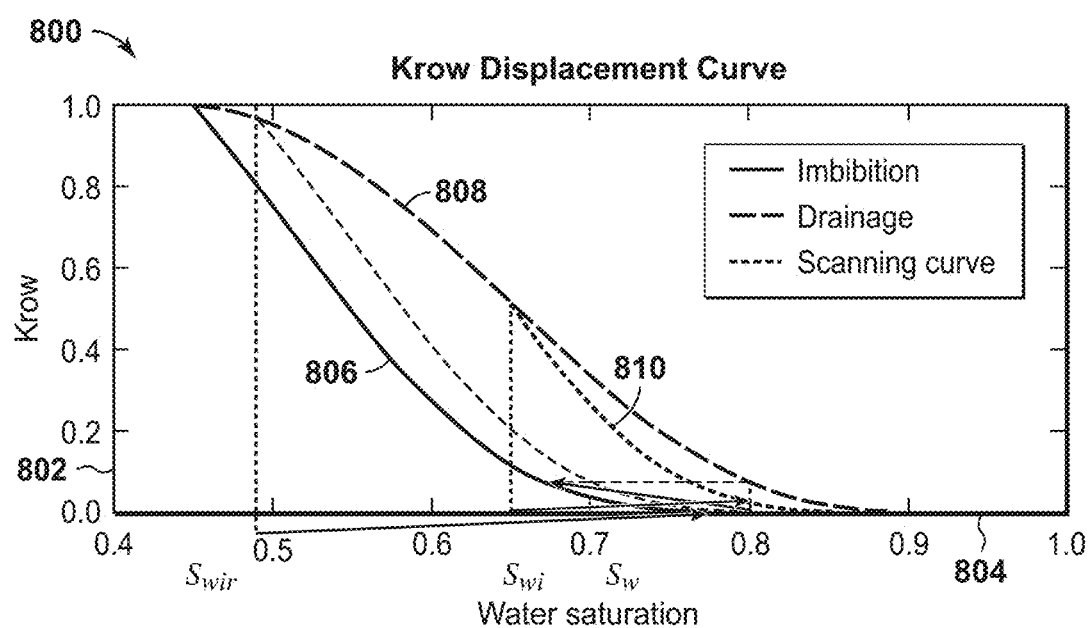
FIG. 8 is an exemplary graph of scanning curve generation for a current saturation ($S_w$) between one minus the residual oil saturation after water flood (1-$S_{orw}$) and one minus the critical oil saturation (1-$S_{oc}$).

FIG. 8 is an exemplary graph 800 of scanning curve for current saturation $S_w$ in between one minus residual oil saturation after water flood 1-$S_{orw}$ and one minus the critical oil saturation 1-$S_{oc}$. The graph 800 may be used to illustrate how SSIA may be used to evaluate the $K_{row}$ scanning for water saturation $S_w$ greater than one minus the residual oil saturation after water flood (e.g., $S_w$>1-$S_{orw}$). The graph 800 represents the displacement curve of oil relative permeability in relation to water $K_{row}$, which includes the imbibition curve 806, drainage curve 808 and scanning curves 810 and 811 shown along the water saturation axis 802 and the oil relative permeability in relation to water $K_{row}$ axis 804. As shown in graph 800, the scanning curve 810 starts at a historical minimal water saturation $S_{wi}$ on the drainage curve 808 and is disposed between the imbibition curve 806 and drainage curve 808. Also, the scanning curve 811 starts at a historical minimal water saturation $S_{wir}$ on the drainage curve 808 and is disposed between the imbibition curve 806 and drainage curve 808. Each value of current saturation $S_w$ along the scanning curves 810 and 811 is bounded within the imbibition curve 806 and the drainage curve 808.

Figure 9:
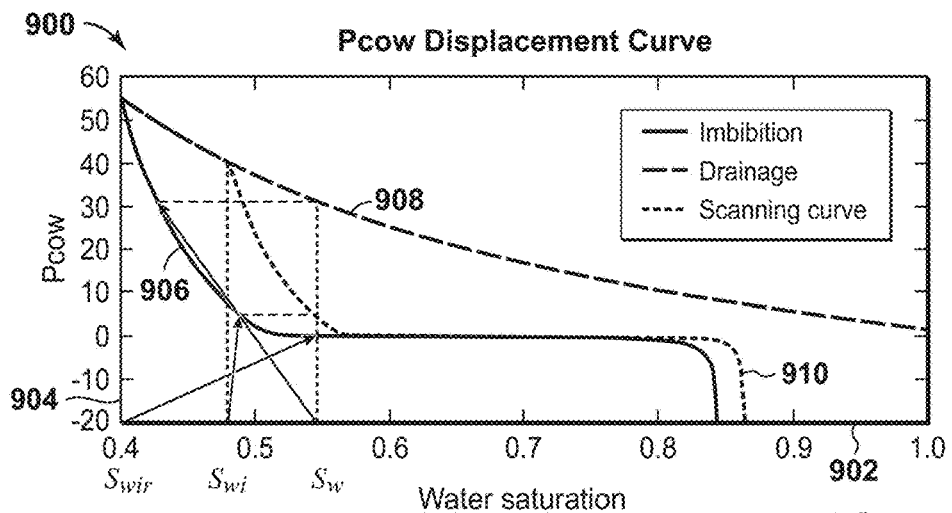
FIG. 9 is an exemplary graph of scanning curve generation for a current saturation ($S_w$) between irreducible water saturation ($S_{wir}$) and one minus the residual oil saturation after water flood (1-$S_{orw}$).

FIG. 9 is an exemplary graph 900 of scanning curve generation for current saturation $S_w$ between irreducible water saturation $S_{wir}$ and one minus residual oil saturation after water flood (1-$S_{orw}$). The graph 900 may be used to illustrate how SSIA may be used to evaluate $P_{cow}$ scanning curve with water saturation ($S_w$) equal to 0.55 with historical minimum water saturation ($S_{wi}$) equal to 0.48. The graph 900 represents the displacement curve of water-oil capillary pressure $P_{cow}$, which includes the imbibition curve 906, drainage curve 908 and scanning curve shown along the water saturation ($S_w$) axis 902 and the water-oil capillary pressure $P_{cow}$ axis 904. As shown in graph 900, the scanning curve 910 starts at a historical minimal water saturation $S_{wi}$ on the drainage curve 908 and is disposed between the imbibition curve 906 and drainage curve 908. Each value of current saturation $S_w$ along the scanning curve 910 is bounded within the imbibition curve 906 and the drainage curve 908.

Figure 10:
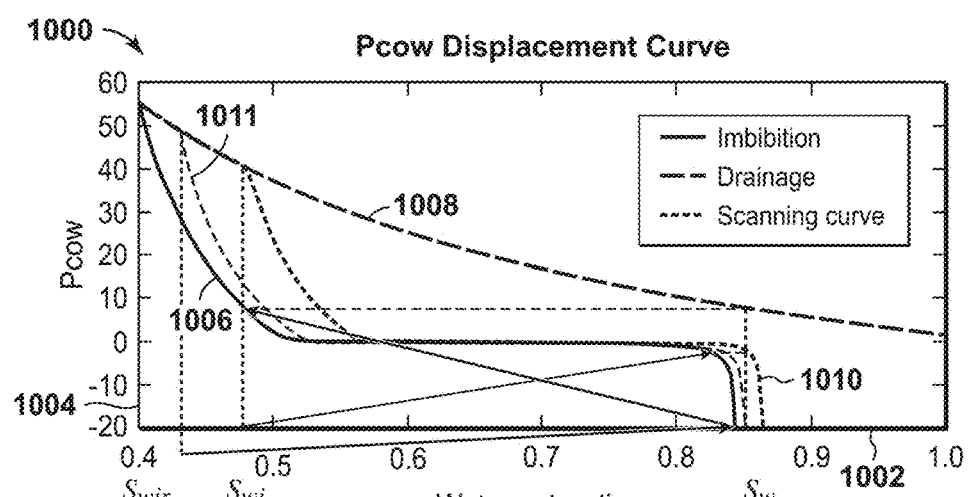
FIG. 10 is an exemplary graph of scanning curve generation for a current saturation ($S_w$) between one minus the residual oil saturation after water flood (1-$S_{orw}$) and one minus the critical oil saturation (1-$S_{oc}$).

FIG. 10 is an exemplary graph 1000 of scanning curve generation for current saturation $S_w$ between one minus residual oil saturation after water flood 1-$S_{orw}$ and one minus the critical oil saturation 1-$S_{oc}$. The graph 1000 may be used to illustrate how SSIA may be used to evaluate $P_{cow}$ scanning curve with water saturation greater than one minus residual oil saturation after water flood ($S_w$>1-$S_{orw}$). The graph 1000 represents the displacement curve of water-oil capillary pressure $P_{cow}$, which includes the imbibition curve 1006, drainage curve 1008 and scanning curves 1010 and 1011 shown along the water saturation axis 1002 and the water-oil capillary pressure $P_{cow}$ axis 1004. As shown in graph 1000, the scanning curve 1010 starts at a historical minimal water saturation $S_{wi}$ on the drainage curve 1008 and is disposed between the imbibition curve 1006 and drainage curve 1008. Also, the scanning curve 1011 starts at an irreducible water saturation $S_{wir}$ on the drainage curve 1008 and is disposed between the imbibition curve 1006 and drainage curve 1008. Each value of the current saturation $S_w$ along the scanning curves 1010 and 1011 are bounded within the imbibition curve 1006 and the drainage curve 1008.

The SSIA involves performing an inverse lookup of the imbibition curve 1006. As a result, the imbibition curve 1006 should be constrained to be monotonically increasing for it to be invertible. Also, the end point of the scanning curves 1010 and 1011 of the capillary pressure curve may have the same value as the end point value imbibition curve 1006. For the algorithm to generate physical scanning curves, each scanning curve may have the same values at one minus residual oil saturation (e.g., 1-$S_{or}$) as the imbibition at one minus residual oil saturation after water flood (Sony) (e.g., 1-$S_{orw}$) for water-oil hysteresis. This may also be similar for gas-oil hysteresis for the left endpoint value of the imbibition curve.

As a third configuration, the CIA, as noted above, may be as follows in equations (e7) and (e8):

$$p_c^{scan}(s_w,s_{wi}) = \beta(s_{wi})(p_c^{drn}(s_w) - p_c^{imb-ssi}(s_w,s_{wi})) + p_c^{imb-ssi}(s_w,s_{wi}) \quad (e7)$$

where $p_c^{imb-ssi}(s_w, s_{wi})$ is obtained using the shift and scale isomorphism in (e4 to e6) and $$\beta(s_{wi}) = \frac{p_c^{scan}(1 - s_{or}(s_{wi})) - p_c^{imb}(1 - s_{orw})}{p_c^{drn}(1 - s_{or}(s_{wi})) - p_c^{imb}(1 - s_{orw})}. \quad (e8)$$

The algorithm is a convex combination of the value obtained from the SSIA and the drainage curve value at the current saturation $S_w$. The algorithm provides uniqueness of the path of the scanning curve corresponding to every historical extreme saturation. The graphical representation is provided as shown in FIG. 11.

Figure 11:
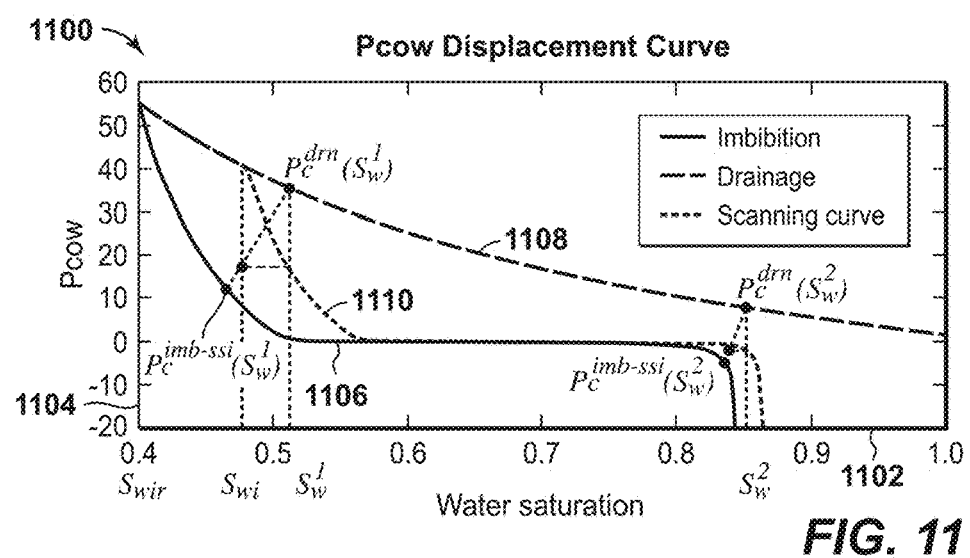
FIG. 11 is an exemplary graph of scanning curve generation by convex isomorphism.

FIG. 11 is an exemplary graph 1100 of scanning curve generation by convex isomorphism. The graph 1100 is used to illustrate how CIA evaluates $P_{cow}$ scanning curve value at various saturations with historical minimal saturation value $S_{wi}$ is equal to 0.48. In this graph 1100, the displacement curves of water-oil capillary pressure $P_{cow}$, which includes the imbibition curve 1106, drainage curve 1108 and scanning curve 1110, are shown along the water saturation axis 1102 and the water-oil capillary pressure $P_{cow}$ axis 1104. As shown in graph 1100, the scanning curve 1110 starts at a historical minimal water saturation $S_{wi}$ on the drainage curve 1108 and is disposed between the imbibition curve 1106 and drainage curve 1108. Each value of the current saturation $S_w$ along the scanning curve 1110 is bounded within the imbibition curve 1106 and the drainage curve 1108. The CIA may be regarded as the combination of the FIA and SSIA.

As a fourth configuration, IIA may be utilized with various displacement curves. This algorithm creates an isomorphism map $\alpha(f^{(n)},*)$ from $(S_{wir}, S_w)$ to $(K_r^{imb}(f^{(n)})^{-1}, K_r^{drn}(f^{(n)})^{-1})$, when $f^{(n)}$ is the $n^{th}$ guess of the displacement function value. The scanning value at the current saturation $S_w$ is $f^*$ such that $\alpha(f^*, S_{wi})$ equals the current saturation $S_w$. As a result, the scanning curves are generated by solving a non-linear equation. The IIA is as follow:

---
Algoritihm 1: Inverse Isomorphism Algorithm

---
Data: $s_w$, $s_{wi}$
Result: scanning curve value $f(s_w)$
$s^{(0)} = 0$, $f^{(0)}$ and n = 1;
while $|s^{(n-1)} - s_w| >$ tolerance do
| compute the n-th guess $f^{(n)}$ based on $f^{(n-1)}$;
| compute $s_w^{drn}(f^{(n)})$ such that $f^{drn}(s_w^{drn}) = f^{(n)}$ where $f^{drn}$ is the
| drainage curve can the connector;
| compute $s_w^{imb}(f^{(n)})$ such that $f^{imb}(s_w^{imb}) = f^{(n)}$ where $f^{imb}$ is the
| imbibition curve can the connector;
| compute $\alpha(f^{(n)}, s_{wi})$ where $\alpha(f^{(n)}, s_{wi})$ is in between (0, 1);
| $s_w^{(n)} = \alpha(f^{(n)}, s_{wi})(s_w^{drn}(f^{(n)}) - s_w^{imb}(f^{(n)})) + s_w^{imb}(f^{(n)})$;
| n = n + 1
end
$f(s_w) = f^{(n-1)}$;

---

Examples of the algorithm is shown graphically in FIGS. 12, 13, 14, and 15.

Figure 12:
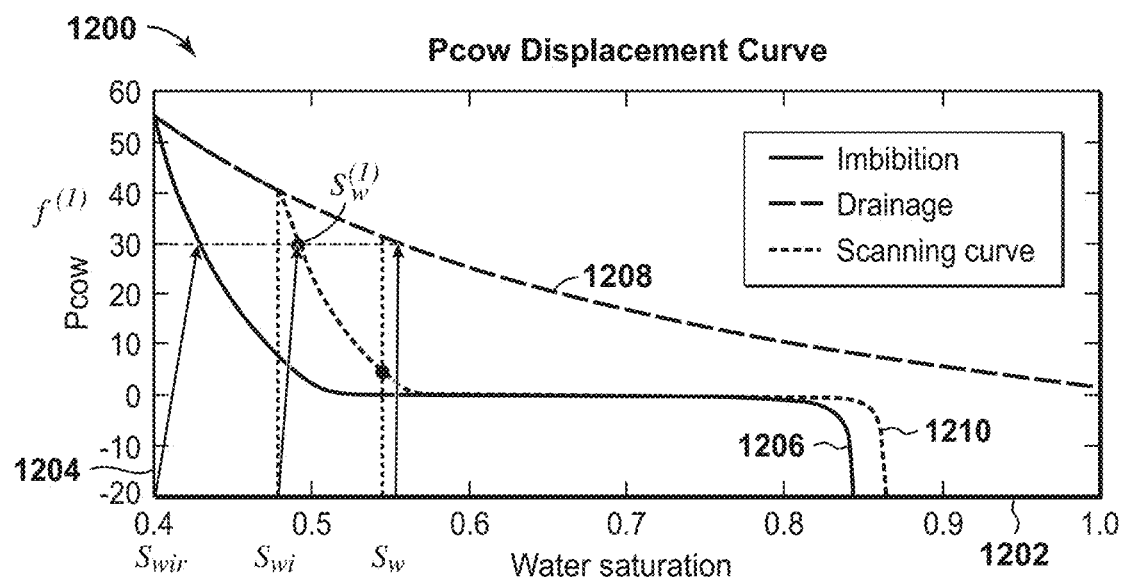
FIG. 12 is an exemplary graph of a first prediction for a displacement curve for the IIA.

FIG. 12 is an exemplary graph 1200 of a first prediction for a displacement curve for the IIA. The graph 1200 represents the displacement curve of water-oil capillary pressure $P_{cow}$, which includes the imbibition curve 1206, drainage curve 1208 and scanning curve 1210 as shown along the water saturation axis 1202 and the water-oil capillary pressure $P_{cow}$ axis 1204. In graph 1200, the scanning curve 1210 starts at a historical minimal water saturation $S_{wi}$ on the drainage curve 1208 and is disposed between the imbibition curve 1206 and drainage curve 1208. Each value of the current saturation $S_w$ along the scanning curve 1210 is bounded within the imbibition curve 1206 and the drainage curve 1208.

Figure 13:
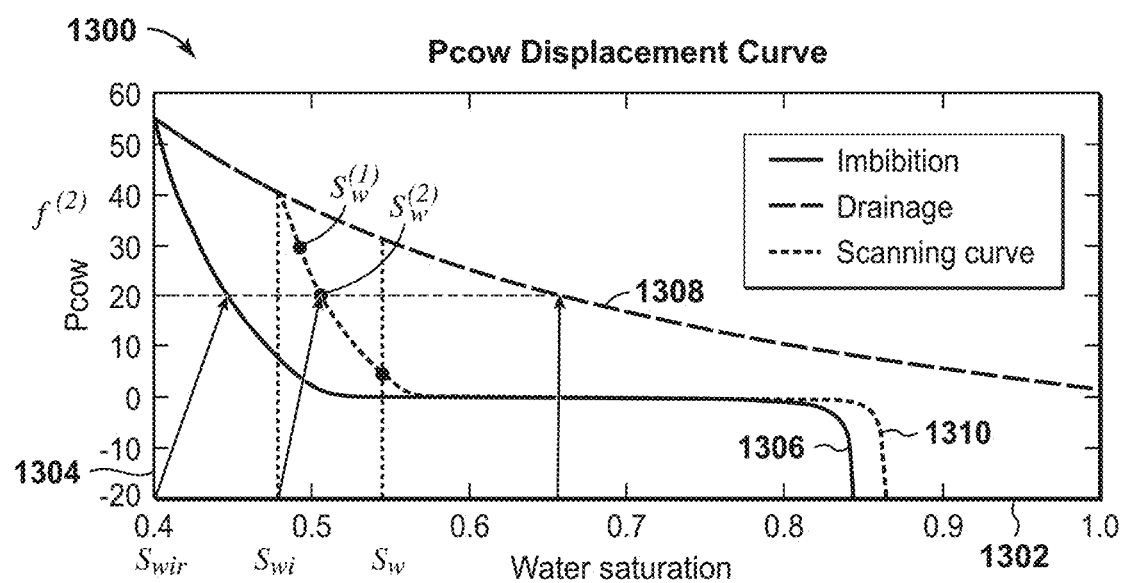
FIG. 13 is an exemplary graph of a second prediction for a displacement curve for the IIA

FIG. 13 is an exemplary graph 1300 of a second prediction for a displacement curve for the IIA. The graph 1300 represents the displacement curve of water-oil capillary pressure $P_{cow}$, which includes the imbibition curve 1306, drainage curve 1308 and scanning curve 1310 as shown along the water saturation ($S_w$) axis 1302 and the water-oil capillary pressure $P_{cow}$ axis 1304. In graph 1300, the scanning curve 1310 starts at a historical minimal water saturation $S_{wi}$ on the drainage curve 1308 and is disposed between the imbibition curve 1306 and drainage curve 1308. Each value of the current saturation $S_w$ along the scanning curve 1310 is bounded within the imbibition curve 1306 and the drainage curve 1308.

Figure 14:
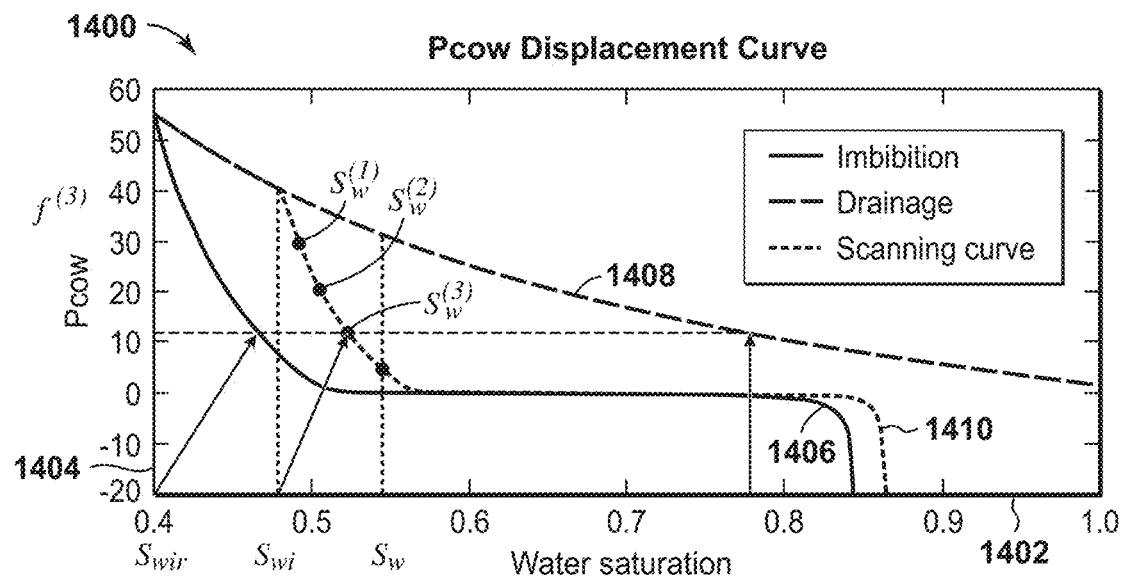
FIG. 14 is an exemplary graph of a third prediction for a displacement curve for the IIA

FIG. 14 is an exemplary graph 1400 of a third prediction for a displacement curve for the IIA. The graph 1400 represents the displacement curve of water-oil capillary pressure $P_{cow}$, which includes the imbibition curve 1406, drainage curve 1408 and scanning curve 1410 shown along the water saturation axis 1402 and the water-oil capillary pressure $P_{cow}$ axis 1404. In graph 1400, the scanning curve 1410 starts at a historical minimal water saturation $S_{wi}$ on the drainage curve 1408 and is disposed between the imbibition curve 1406 and drainage curve 1408. Each value of the current saturation $S_w$ along the scanning curve 1410 is bounded within the imbibition curve 1406 and the drainage curve 1408.

Figure 15:
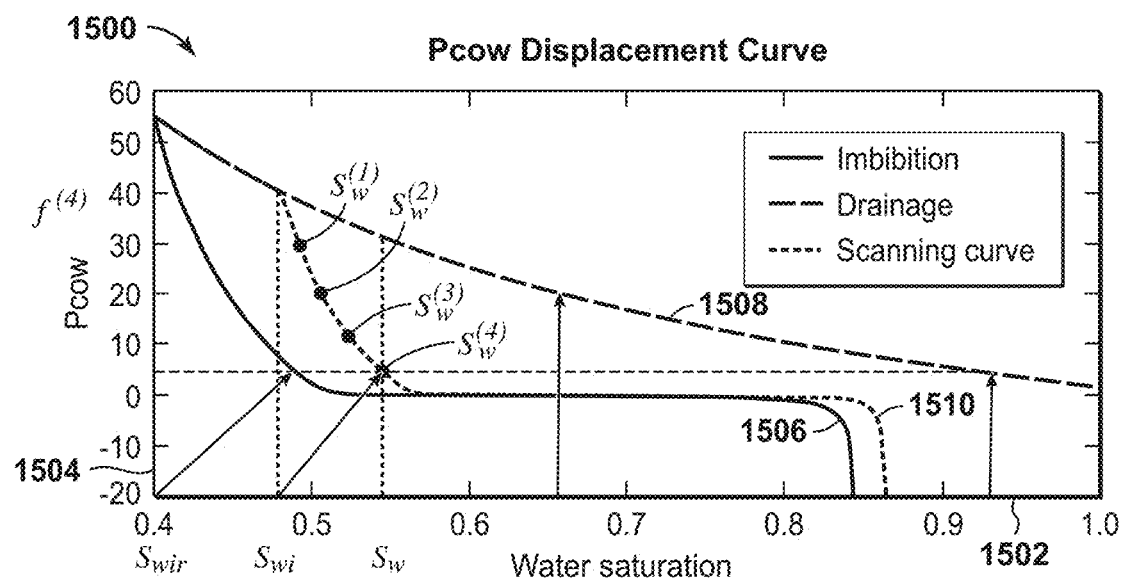
FIG. 15 is an exemplary graph of a fourth prediction of a displacement curve for the IIA

FIG. 15 is an exemplary graph 1500 of a fourth prediction for a displacement curve for the IIA. The graph 1500 is the converged solution of IIA, which is the scanning curve value at saturation ($S_w$) equal to 0.55 with historical minimum water saturation ($S_{wi}$) equal to 0.55. The graph 1500 represents the displacement curve of water-oil capillary pressure $P_{cow}$, which includes the imbibition curve 1506, drainage curve 1508 and scanning curve 1510 shown along the water saturation ($S_w$) axis 1502 and the water-oil capillary pressure $P_{cow}$ axis 1504. In graph 1500, the scanning curve 1510 starts at a historical minimal water saturation $S_{wi}$ on the drainage curve 1508 and is disposed between the imbibition curve 1506 and drainage curve 1508. Each value of the current saturation $S_w$ along the scanning curve 1510 is bounded within the imbibition curve 1506 and the drainage curve 1508.

As shown in FIGS. 12, 13, 14, and 15, the nonlinear solve in IIA is used to compute the scanning curve value at a given current saturation $S_w$. The algorithm provides convergence of the nonlinear solve with the assumption that bounding curves are monotonic function (e.g., the respective imbibition curves 1206, 1306, 1406, 1506 and drainage curves 1208, 1308, 1408, and 1508. The scanning curves (e.g., the scanning curves 1210, 1310, 1410, 1510) generated using the algorithm satisfy the criteria because the isomorphism map uniquely determines the path of the scanning curve corresponding to each historical extreme saturation. Each of these scanning curves are bounded by the bounding curves because they are generated based on the convex combination of the values at the respective imbibition and drainage curves.

In yet another configuration, the algorithms may be generalized into the IA, as noted above. The IA may be expressed, as noted above, in equation (e1):

$$k_r^{scan}(s_w, s_{wi}) = \alpha(s_w, s_{wi})(k_r^{drn}(s_w^{drn}(s_w, s_{wi})) - k_r^{imb}(s_w^{imb}(s_w, s_{wi}))) + k_r^{imb}(s_w^{imb}(s_w, s_{wi})) \quad (e1)$$

where $\alpha(s_w, s_{wi})$ is a function takes value in between 0 and 1; the function value of $s_w^{drn}(s_w, s_{wi})$ is in between $s_w$ and $k_r^{drn^{-1}}(k_r^{imb}(s_w))$; and the function value of $s_w^{imb}(s_w, s_{wi})$ is in between $s_w$ and $k_r^{imb^{-1}}(k_r^{drn}(s_w))$. At one of the functions $s_w^{drn}$, $s_w^{imb}$ and $\alpha$ is required to be an isomorphism map. Accordingly, FIA, SSIA, CIA, and IIA are different constructions based on the selection of the functions for $S_w^{imb}$, $S_w^{drn}$, and $\alpha$ in IA.

Beneficially, the present techniques provide various enhancements as compared to the conventional approaches. For example, the present techniques are not required to solve the constitutive equations to obtain the convex combination and may be used to calculate capillary pressure and relative permeability hysteresis. Further, the unified isomorphism framework for generating the scanning curves provides a mechanism to integrate algorithms directly into reservoir simulators. As a result, the present techniques mathematically manages the solution to satisfy the physical requirements of the scanning curves, which are useful for modeling hysteresis in reservoir simulation. Accordingly, the present techniques provide an enhanced method to calculate scanning curve values of the relative permeability and capillary pressure at arbitrary saturation for the reservoir simulator to model hysteresis. Further, the present techniques use isomorphism to correspond the scanning curve to its historical saturation.

The presently described methods and systems provide various enhancements as compared to conventional approaches. For example, in typical subsurface models each cell or grid (or a group of cells or grids) represent a section of the subsurface (i.e.) rock with specific properties, such as specific fluid properties. In such models it is desirable to constrain such properties to be physically realistic (i.e., to constrain the properties to those that are physically possible in the subsurface). In the present methods and systems, the bounding curves provide a way to guarantee that the properties modeled by the scanning curves will be physically realistic. Thus, simulations may be run on the fly and the user can have confidence that the results provided by the simulations are physically realistic without needing to inspect the curves to verify the physical realness of the properties of the scanning curves. Accordingly, the present methods and systems can be sued to provide more accurate predictions of subsurface properties (e.g., fluid flow in the subsurface).

Additionally, the presently described methods and systems may be more computationally efficient that convention methods. For example, the use of the bounding curves in generating the scanning curves places a limit on the number of curves that are modeled. Thus, the simulation may run more efficiently as there are reduced iterations (i.e., curves) that need to be modeled.

The present methods and systems may provide various enhancements for hydrocarbon operations. For example, the present methods and systems can be used to generate simulations that provide a projection of hydrocarbon production over time. For example, the present methods and systems can be used to model and simulate the subsurface and history match production data to provide improved understanding of the subsurface structure and geology. For example, the present method sand systems can be used for troubleshooting various hydrocarbon operations, such as when the predicted fluid flow rate does not match actual production flow rates this can be used to analyze whether or not there was mud or if the initial well completion was not done property. Additionally, the present methods and systems can be used to identify and model and simulate various well-remediation strategies.

Persons skilled in the technical field will readily recognize that in practical applications of the disclosed methodology, it is partially performed on a computer, typically a suitably programmed digital computer. Further, some portions of the detailed descriptions which follow are presented in terms of procedures, steps, logic blocks, processing and other symbolic representations of operations on data bits within a computer memory. These descriptions and representations are the means used by those skilled in the data processing arts to most effectively convey the substance of their work to others skilled in the art. In the present application, a procedure, step, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "processing" or "computing", "calculating", "comparing", "determining", "displaying", "copying," "producing," "storing," "adding," "applying," "executing," "maintaining," "updating," "creating," "constructing" "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Embodiments of the present techniques also relate to an apparatus for performing the operations herein. This apparatus may be specially constructed for the required purposes, or it may comprise a general-purpose computer selectively activated or reconfigured by a computer program stored in the computer (e.g., one or more sets of instructions). Such a computer program may be stored in a computer readable medium. A computer-readable medium includes any mechanism for storing or transmitting information in a form readable by a machine (e.g., a computer). For example, but not limited to, a computer-readable (e.g., machine-readable) medium includes a machine (e.g., a computer) readable storage medium (e.g., read only memory ("ROM"), random access memory ("RAM"), magnetic disk storage media, optical storage media, flash memory devices, etc.), and a machine (e.g., computer) readable transmission medium (electrical, optical, acoustical or other form of propagated signals (e.g., carrier waves, infrared signals, digital signals, etc.)).

Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present techniques are in no way limited to implementation in any specific operating system or environment.

By way of example, a simplified representation for subsurface structures is utilized to create subsurface models, which may be used in hydrocarbon operations. Thus, the present techniques may be used to enhance construction of subsurface models, which may be used for hydrocarbon operations and, more particularly, to subsurface modeling. For a subsurface model, a structural framework is created from subsurface measurements. The structural framework may include various objects, such as faults, faults, horizons, and if necessary, one or more surfaces that bound the area of interest. The different objects are meshed to define closed volumes (e.g., zones, compartments, or subvolumes). Then, the closed volumes may be partitioned into small cells defined by the grid. Finally, properties are assigned to cells or objects (e.g., surface transmissibility) and individual cells (e.g., rock type and/or porosity) in the structural framework to form the subsurface model. The subsurface model may be upscaled to perform a simulation.

The present techniques may be utilized to enhance the creation of a subsurface model. The subsurface model, which may include a reservoir model and/or geologic model, is a computerized representation of a subsurface region based on geophysical and geological observations associated with at least a portion of the specified subsurface region. Subsurface models, such as reservoir models, are typically used as input data for reservoir simulators or reservoir simulation programs that compute predictions for the behavior of rocks and fluids contained within a subsurface region under various scenarios of hydrocarbon recovery. Using subsurface models in simulations provides a mechanism to identify which recovery options offer the most economic, efficient, and effective development plans for a subsurface region (e.g., a particular reservoir and/or field). Accordingly, the generation of the scanning curves may enhance the simulations.

Construction of a subsurface model is typically a multi-step process. Initially, a structural model or structural framework is created from objects (e.g., surfaces, such as faults, horizons, and if necessary, additional surfaces that bound the area of interest for the model). The different objects define closed volumes, which may be referred to as zones, subvolumes, compartments and/or containers. Then, each zone is meshed or partitioned into sub-volumes (e.g., cells, mesh elements or voxels) defined by a mesh (e.g., a 3-D mesh or 3-D grid). Once the partitioning is performed, properties are assigned to objects (e.g., transmissibility) and individual sub-volumes (e.g., rock type, porosity, permeability, rock compressibility, or oil saturation). The objects (e.g., surfaces) are represented as meshes, while the mesh elements form a mesh. Each mesh element may include assignment of displacement curves. The assignment of properties is often also a multistep process where mesh elements are assigned properties. The properties may be assigned in the creation of the subsurface model.

Further, the reservoir properties may include reservoir quality parameters, such as porosity and permeability, but may include other properties, such as clay content, cementation factors, and other factors that affect the storage and deliverability of fluids contained in the pores of the rocks. Geostatistical techniques may be used to populate the cells with porosity and permeability values that are appropriate for the rock type of each cell. Rock pores are saturated with groundwater, oil or gas. Fluid saturations may be assigned to the different cells to indicate which fraction of their pore space is filled with the specified fluids. Fluid saturations and other fluid properties may be assigned deterministically or geostatistically.

Geostatistics interpolates observed data and superimposes an expected degree of variability. As an example, kriging, which uses the spatial correlation among data and intends to construct the interpolation via semi-variograms, may be used. To reproduce more realistic spatial variability and help assessing spatial uncertainty between data, geostatistical simulation is often used, for example based on variograms, training images, or parametric geological objects. Perturbing surface properties or mesh element properties, such as rock type, reservoir properties or fluid properties, is a conventional process, which may utilize deterministic or geostatistical methods to assign them. The assignment may include choosing a different variogram for kriging or a different seed for geostatistical simulation.

Figure 16:
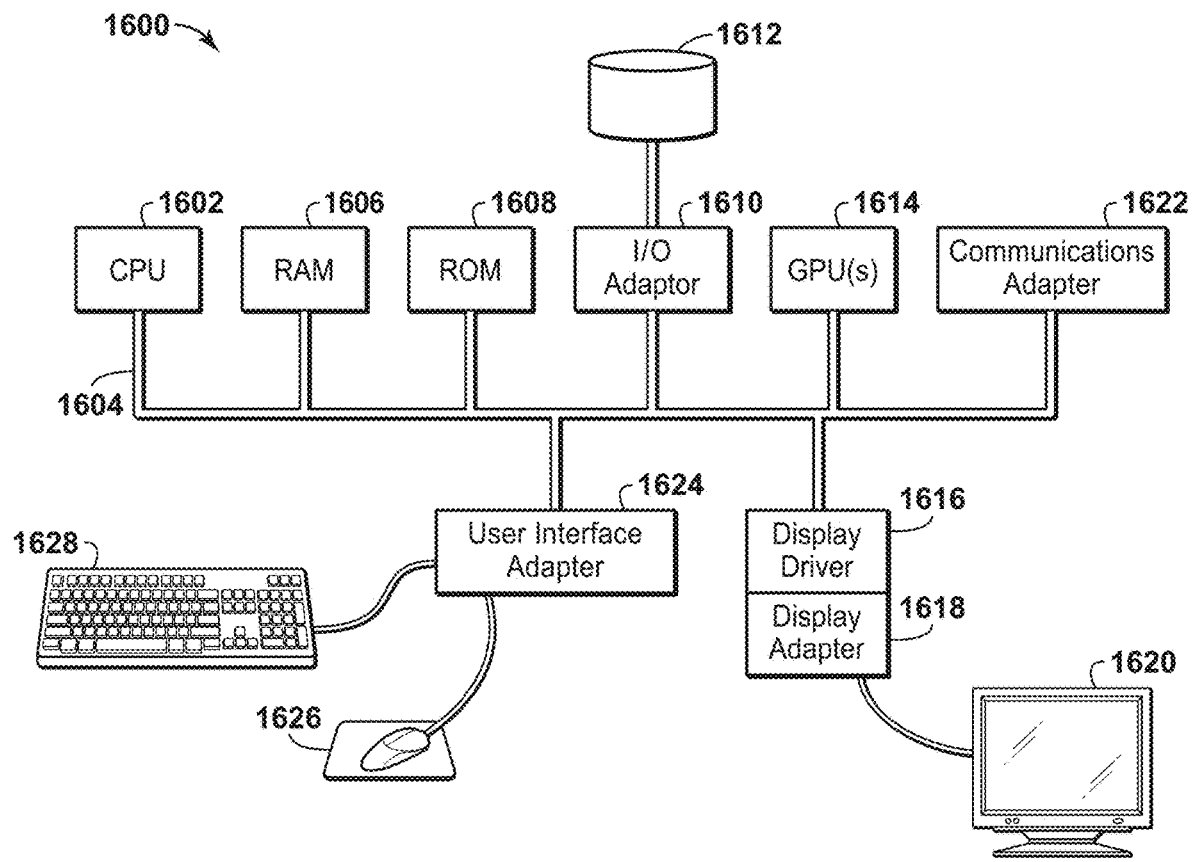
FIG. 16 is a block diagram of a computer system that may be used to perform any of the methods disclosed herein.

Further, one or more embodiments may include methods that are performed by executing one or more sets of instructions to perform modeling enhancements in various stages. For example, FIG. 16 is a block diagram of a computer system 1600 that may be used to perform any of the methods disclosed herein. A central processing unit (CPU) 1602 is coupled to system bus 1604. The CPU 1602 may be any general-purpose CPU, although other types of architectures of CPU 1602 (or other components of exemplary system 1600) may be used as long as CPU 1602 (and other components of system 1600) supports the inventive operations as described herein. The CPU 1602 may execute the various logical instructions according to disclosed aspects and methodologies. For example, the CPU 1602 may execute machine-level instructions for performing processing according to aspects and methodologies disclosed herein.

The computer system 1600 may also include computer components such as a random access memory (RAM) 1606, which may be SRAM, DRAM, SDRAM, or the like. The computer system 1600 may also include read-only memory (ROM) 1608, which may be PROM, EPROM, EEPROM, or the like. RAM 1606 and ROM 1608 hold user and system data and programs, as is known in the art. The computer system 1600 may also include an input/output (I/O) adapter 1610, a graphical processing unit (GPU) 1614, a communications adapter 1622, a user interface adapter 1624, and a display adapter 1618. The I/O adapter 1610, the user interface adapter 1624, and/or communications adapter 1622 may, in certain aspects and techniques, enable a user to interact with computer system 1600 to input information.

The I/O adapter 1610 preferably connects a storage device(s) 1612, such as one or more of hard drive, compact disc (CD) drive, floppy disk drive, tape drive, etc. to computer system 1600. The storage device(s) may be used when RAM 1606 is insufficient for the memory requirements associated with storing data for operations of embodiments of the present techniques. The data storage of the computer system 1600 may be used for storing information and/or other data used or generated as disclosed herein. The communications adapter 1622 may couple the computer system 1600 to a network (not shown), which may enable information to be input to and/or output from system 1600 via the network (for example, a wide-area network, a local-area network, a wireless network, any combination of the foregoing). User interface adapter 1624 couples user input devices, such as a keyboard 1628, a pointing device 1626, and the like, to computer system 1600. The display adapter 1618 is driven by the CPU 1602 to control, through a display driver 1616, the display on a display device 1620. The subsurface model, simulation results and/or scanning curves may be displayed, according to disclosed aspects and methodologies.

The architecture of system 1600 may be varied as desired. For example, any suitable processor-based device may be used, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may use any number of suitable structures capable of executing logical operations according to the embodiments.

As may be appreciated, the method may be implemented in machine-readable logic, such that a set of instructions or code that, when executed, performs the instructions or operations from memory. By way of example, the computer system includes a processor; an input device and memory. The input device is in communication with the processor and is configured to receive input data associated with a subsurface region. The memory is in communication with the processor and the memory has a set of instructions, wherein the set of instructions, when executed, are configured to: obtain a subsurface model associated with a subsurface region, wherein the subsurface model comprises a plurality of mesh elements; obtain bounding curves for one or more of plurality of mesh elements; generate one or more isomorphic reversible scanning curves for the one or more of plurality of mesh elements; simulate fluid flow within the subsurface model, wherein the one or more isomorphic reversible scanning curves are used in the simulation to model fluid heuristics and displacement; and output results from the simulation of the subsurface model.

In one or more configurations, the system may include one or more enhancements. The system may comprise wherein the isomorphic reversible scanning curve provides a unique scanning curve value at each saturation; wherein the isomorphic reversible scanning curve has a substantially similar shape to the bounding curves; wherein the isomorphic reversible scanning curve does not exceed the bounding curve for each scanning curve value at each saturation; wherein the set of instructions, when executed by the processor, are further configured to: generate one or more isomorphic reversible scanning curves comprises computing the Isomorphic Algorithm (IA) set forth in the following:

$$kr^{scan}(s_w, s_{wi}) = \alpha(s_w, s_{wi})(kr^{drn}(s_w^{drn}(s_w, s_{wi})) - kr^{imb}(s_w^{imb}(s_w, s_{wi}))) + kr^{imb}(s_w^{imb}(s_w, s_{wi}))$$

where $\alpha(s_w, s_{wi})$ is a weight function that has a value in the range between 0 and 1, $s_w^{drn}(s_w, s_{wi})$ is the sample saturation value on drainage curve and has a function value in a range between $s_w$ and $k_r^{drn^{-1}}(k_r^{imb}(s_w))$; $s_w^{imb}(s_w, s_{wi})$ is the sample saturation value on the imbibition curve and has a function value in a range between $s_w$ and $k_r^{imb^{-1}}(k_r^{drn}(s_w))$ krscan is the relative permeability, krdrn is the drainage curve, krimb is the imbibition curve, swi is the historical minimal water saturation and sw is the current saturation; wherein the set of instructions, when executed by the processor, are further configured to: generate one or more isomorphic reversible scanning curves comprises computing the Forward Isomorphic Algorithm (FIA) set forth in the following:

$$kr^{scan}(s_w, s_{wi}) = \begin{cases} \alpha(s_w, s_{wi})(kr^{imb}(s_w) - kr^{drn}(s_w)) + kr^{drn}(s_w) & \text{for all } s_{wi} < s_w \leq 1 - s_{orw} \\ \alpha(s_w, s_{wi})(kr^{conn}(s_w) - kr^{drn}(s_w)) + kr^{drn}(s_w) & \text{for all } 1 - s_{orw} < s_w \leq 1 - s_{or} \end{cases}$$

with $$\alpha(s_w, s_{wi}) = \begin{cases} \dfrac{s_w - s_{wi}}{s_w - s_{wir}} & \text{for all } s_{wi} < s_w \leq 1 - s_{orw} \\ \dfrac{s_w - s_{wi}}{s_w - s_{wi}^*(s_w)} & \text{for all } 1 - s_{orw} < s_w \leq 1 - s_{or} \end{cases}$$

where $\alpha(s_w, s_{wi})$ is a weight function that has a value in the range between 0 and 1, s*wi is the historical minimal saturation corresponding to the saturation $S_w$ on the connector curve, krscan is the relative permeability, krconn is a connector curve, krdrn is the drainage curve, krimb is the imbibition curve, swi is the historical minimal water saturation, sorw is the residual oil saturation after water flood, sor is a residual oil saturation and sw is the current saturation; wherein the set of instructions, when executed by the processor, are further configured to: generate one or more isomorphic reversible scanning curves comprises computing the Convex Isomorphic Algorithm (CIA) set forth in the following:

$$p_c^{scan}(s_w, s_{wi}) = \beta(s_{wi})(p_c^{drn}(s_w) - p_c^{imb-ssi}(s_w, s_{wi})) + p_c^{imb-ssi}(s_w, s_{wi})$$

where $p_c^{imb-ssi}(s_w, s_{wi})$ is obtained using the shift and scale isomorphism and $$\beta(s_{wi}) = \frac{p_c^{scan}(1 - s_{or}(s_{wi})) - p_c^{imb}(1 - s_{orw})}{p_c^{drn}(1 - s_{or}(s_{wi})) - p_c^{imb}(1 - s_{orw})}$$

where pcscan is scanning curve, krconn is a connector curve, pcdrn is drainage curve, pcimb is imbibition curve, swi is the historical minimal water saturation, sorw is the residual oil saturation after water flood, sor is a residual oil saturation and sw is the current saturation; wherein the set of instructions, when executed by the processor, are further configured to: generate one or more isomorphic reversible scanning curves comprises computing the Scale and Shift Isomorphic Algorithm (SSIA) set forth in the following:

$$kr^{scan}(s_w, s_{wi}) = \begin{cases} kr^{imb}(\alpha(s_w, s_{wi})^p(s_w - s_{imb}(s_w)) + s_{imb}(s_w)) \text{ for all } s_{wi} < s_w \leq 1 - s_{orw} \\ kr^{imb}(\alpha(s_w, s_{wi})^p((1 - s_{orw}) - s_{imb}(s_w)) + s_{imb}(s_w)) \text{ for all } 1 - s_{orw} < s_w \leq 1 - s_{or} \end{cases}$$

with $$\alpha(s_w, s_{wi}) = \begin{cases} \frac{s_w - s_{wi}}{s_w - s_{wir}} \text{ for all } s_{wi} < s_w \leq 1 - s_{orw} \\ \frac{s_w - s_{wi}}{s_w - s_{wi}^*(s_w)} \text{ for all } 1 - s_{orw} < s_w \leq 1 - s_{or} \end{cases} \text{ and } s_{imb} = kr^{imb-1}(kr^{drn}(s_w))$$

where $\alpha(s_w, s_{wi})$ is a weight function that has a value in the range between 0 and 1, s*wi is the historical minimal saturation corresponding to the saturation Sw on the connector curve, krscan is the relative permeability, krdrn is the drainage curve, krimb is the imbibition curve, swi is the historical minimal water saturation, sorw is the residual oil saturation after water flood, sor is a residual oil saturation and sw is the current saturation; wherein the set of instructions, when executed by the processor, are further configured to: generate one or more isomorphic reversible scanning curves comprises computing an Inverse Isomorphic Algorithm (IIA) by solving a nonlinear expression to obtain a scanning curve value at a given current saturation Sw, wherein the bounding curves are monotonic functions.

It should be understood that the preceding is merely a detailed description of specific embodiments of the invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents. It is also contemplated that structures and features embodied in the present examples can be altered, rearranged, substituted, deleted, duplicated, combined, or added to each other. As such, it will be apparent, however, to one skilled in the art, that many modifications and variations to the embodiments described herein are possible. All such modifications and variations are intended to be within the scope of the present invention, as defined by the appended claims.

The invention claimed is:

1. A method for enhancing hydrocarbon operations for a subsurface region comprising:
    obtaining a subsurface model associated with a subsurface region, wherein the subsurface model comprises a plurality of mesh elements;
    obtaining bounding curves for one or more of plurality of mesh elements;
    generating one or more isomorphic reversible scanning curves for the one or more of plurality of mesh elements;
    simulating fluid flow within the subsurface model, wherein the one or more isomorphic reversible scanning curves are used in the simulation to model fluid heuristics and displacement; and
    outputting results from the simulation of the subsurface model.

2. The method of claim 1, wherein at least part of one of the bounding curves is obtained from observed measured data.

3. The method of claim 1, wherein the bounding curves are scaled to a range of uncertainty.

4. The method of claim 1, wherein the isomorphic reversible scanning curve provides a unique scanning curve value at each saturation.

5. The method of claim 1, wherein the isomorphic reversible scanning curve has a substantially similar shape to the bounding curves.

6. The method of claim 1, wherein the isomorphic reversible scanning curve does not exceed at least one of the bounding curves for each scanning curve value at each saturation.

7. The method of claim 1, further comprising generating one or more isomorphic reversible scanning curves comprises computing an Isomorphic Algorithm (IA) set forth in the following:

$$kr^{scan}(s_w, s_{wi}) = \alpha(s_w, s_{wi})(kr^{drn}(s_w^{drn}(s_w, s_{wi})) - kr^{imb}(s_w^{imb}(s_w, s_{wi}))) + kr^{imb}(s_w^{imb}(s_w, s_{wi}))$$

where $\alpha(s_w, s_{wi})$ is a weight function that has a value in the range between 0 and 1, $s_w^{drn}(s_w, s_{wi})$ is a sample saturation value on a drainage curve and has a function value in a range between $s_w$ and $k_r^{drn-1}(k_r^{imb}(s_w))$, $s_w^{imb}(s_w, s_{wi})$ is a sample saturation value on an imbibition curve and has a function value in a range between $s_w$ and $k_r^{imb-1}(k_r^{drn}(s_w))$, $k_r^{scan}$ is a relative permeability, $k_r^{drn}$ is the drainage curve, $k_r^{imb}$ is the imbibition curve, $s_{wi}$ is a historical minimal water saturation and $s_w$ is a current water saturation.

8. The method of claim 1, wherein generating one or more isomorphic reversible scanning curves comprises computing a Forward Isomorphic Algorithm (FIA) set forth in the following:

$$kr^{scan}(s_w, s_{wi}) = \begin{cases} \alpha(s_w, s_{wi})(kr^{imb}(s_w) - kr^{drn}(s_w)) + kr^{drn}(s_w) \text{ for all } s_{wi} < s_w \leq 1 - s_{orw} \\ \alpha(s_w, s_{wi})(kr^{conn}(s_w) - kr^{drn}(s_w)) + kr^{drn}(s_w) \text{ for all } 1 - s_{orw} < s_w \leq 1 - s_{or} \end{cases}$$

with $$\alpha(s_w, s_{wi}) = \begin{cases} \dfrac{s_w - s_{wi}}{s_w - s_{wir}} \text{ for all } s_{wi} < s_w \leq 1 - s_{orw} \\ \dfrac{s_w - s_{wi}}{s_w - s^*_{wi}(s_w)} \text{ for all } 1 - s_{orw} < s_w \leq 1 - s_{or} \end{cases}$$

where $\alpha(s_w, s_{wi})$ is a weight function that has a value in the range between 0 and 1, $s^*_{wi}$ is a historical minimal saturation corresponding to a current water saturation $S_w$ on a connector curve, $k_r^{scan}$ is a relative permeability, $k_r^{conn}$ is a connector curve, $k_r^{drn}$ is a drainage curve, $k_r^{imb}$ is an imbibition curve, $s_{wi}$ is a historical minimal water saturation, $s_{orw}$ is a residual oil saturation after water flood, $s_{or}$ is a residual oil saturation and $s_w$ is the current water saturation.

9. The method of claim 1, wherein generating one or more isomorphic reversible scanning curves comprises computing a Convex Isomorphic Algorithm (CIA) set forth in the following:

$$p_c^{scan}(s_w, s_{wi}) = \beta(s_{wi})(p_c^{drn}(s_w) - p_c^{imb-ssi}(s_w, s_{wi})) + p_c^{imb-ssi}(s_w, s_{wi})$$

where $p_c^{imb-ssi}(s_w, s_{wi})$ is obtained using a shift and scale isomorphism and $$\beta(s_{wi}) = \frac{p_c^{scan}(1 - s_{or}(s_{wi})) - p_c^{imb}(1 - s_{orw})}{p_c^{drn}(1 - s_{or}(s_{wi})) - p_c^{imb}(1 - s_{orw})}$$

where $p_c^{scan}$ is a scanning curve, $k_r^{conn}$ is a connector curve, $p_c^{drn}$ is a drainage curve, $p_c^{imb}$ is an imbibition curve, $\beta$ is a ratio of sampling from the drainage curve, $s_{wi}$ is a historical minimal water saturation, $s_{orw}$ is a residual oil saturation after water flood, $s_{or}$ is a residual oil saturation and $s_w$ is a current water saturation.

10. The method of claim 1, wherein generating one or more isomorphic reversible scanning curves comprises computing a Scale and Shift Isomorphic Algorithm (SSIA) set forth in the following:

$$kr^{scan}(s_w, s_{wi}) = \begin{cases} kr^{imb}(\alpha(s_w, s_{wi})^p(s_w - s_{imb}(s_w)) + s_{imb}(s_w)) \text{ for all } s_{wi} < s_w \leq 1 - s_{orw} \\ kr^{imb}(\alpha(s_w, s_{wi})^p((1 - s_{orw}) - s_{imb}(s_w)) + s_{imb}(s_w)) \text{ for all } 1 - s_{orw} < s_w \leq 1 - s_{or} \end{cases}$$

with $$\alpha(s_w, s_{wi}) = \begin{cases} \dfrac{s_w - s_{wi}}{s_w - s_{wir}} \text{ for all } s_{wi} < s_w \leq 1 - s_{orw} \\ \dfrac{s_w - s_{wi}}{s_w - s^*_{wi}(s_w)} \text{ for all } 1 - s_{orw} < s_w \leq 1 - s_{or} \end{cases} \text{ and } s_{imb} = kr^{imb-1}(kr^{drn}(s_w))$$

where $\alpha(s_w, s_{wi})$ is a weight function that has a value in the range between 0 and 1, $s^*_{wi}$ is a historical minimal saturation corresponding to a current water saturation $S_w$ on a connector curve, $k_r^{scan}$ is a relative permeability, $k_r^{drn}$ is a drainage curve, $k_r^{imb}$ is an imbibition curve, $s_{wi}$ is a historical minimal water saturation, $s_{orw}$ is a residual oil saturation after water flood, $s_{or}$ is a residual oil saturation and $s_w$ is the current water saturation.

11. The method of claim 1, wherein generating one or more isomorphic reversible scanning curves comprises computing an Inverse Isomorphic Algorithm (IIA) by solving a nonlinear expression to obtain a scanning curve value at a given current water saturation $S_w$, wherein the bounding curves are monotonic functions.

12. The method of claim 1, further comprising causing a well to be drilled based on the output results.

13. The method of claim 1, comprising performing a hydrocarbon operation based on the results from the simulation of the subsurface model.

14. The method of claim 1, wherein the outputting the results from the simulation comprise displaying time-varying fluid pressures and fluid compositions.

15. A system for generating a subsurface model associated with a subsurface region, comprising:
a processor;
an input device in communication with the processor and configured to receive input data associated with a subsurface region;
memory in communication with the processor, the memory having a set of instructions, wherein the set of instructions, when executed by the processor, are configured to:
obtain a subsurface model associated with a subsurface region, wherein the subsurface model comprises a plurality of mesh elements;
obtain bounding curves for one or more of plurality of mesh elements;
generate one or more isomorphic reversible scanning curves for the one or more of plurality of mesh elements;
simulate fluid flow within the subsurface model, wherein the one or more isomorphic reversible scanning curves are used in the simulation to model fluid heuristics and displacement; and
output results from the simulation of the subsurface model.

16. The system of claim 15, wherein the isomorphic reversible scanning curves provide a unique scanning curve value at each saturation.

17. The system of claim 15, wherein the isomorphic reversible scanning curves have a substantially similar shape to the bounding curves.

18. The system of claim 15, wherein the isomorphic reversible scanning curve does not exceed at least one of the bounding curves for each scanning curve value at each saturation.

19. The system of claim 15, wherein the set of instructions, when executed by the processor, are further configured to: generate one or more isomorphic reversible scanning curves comprises computing an Isomorphic Algorithm (IA) set forth in the following:

$$kr^{scan}(s_w,s_{wi}) = \alpha(s_w,s_{wi})(kr^{drn}(s_w^{drn}(s_w,s_{wi})) - kr^{imb}(s_w^{imb}(s_w,s_{wi}))) + kr^{imb}(s_w^{imb}(s_w,s_{wi}))$$

where $\alpha(s_w, s_{wi})$ is a weight function that has a value in the range between 0 and 1, $s_w^{drn}(s_w, s_{wi})$ is a sample saturation value on a drainage curve and has a function value in a range between $s_w$ and $k_r^{drn^{-1}}(k_r^{imb}(s_w))$; $s_w^{imb}(s_w, s_{wi})$ is the sample saturation value on an imbibition curve and has a function value in a range between $s_w$ and $k_r^{imb^{-1}}(k_r^{drn}(s_w))$, $k_r^{scan}$ is a relative permeability, $k_r^{drn}$ is the drainage curve, $k_r^{imb}$ is the imbibition curve, $s_{wi}$ is a historical minimal water saturation and $s_w$ is a current water saturation.

20. The system of claim 15, wherein the set of instructions, when executed by the processor, are further configured to: generate one or more isomorphic reversible scanning curves comprises computing a Forward Isomorphic Algorithm (FIA) set forth in the following:

$$kr^{scan}(s_w, s_{wi}) = \begin{cases} \alpha(s_w, s_{wi})(kr^{imb}(s_w) - kr^{drn}(s_w)) + kr^{drn}(s_w) \text{ for all } s_{wi} < s_w \leq 1 - s_{orw} \\ \alpha(s_w, s_{wi})(kr^{conn}(s_w) - kr^{drn}(s_w)) + kr^{drn}(s_w) \text{ for all } 1 - s_{orw} < s_w \leq 1 - s_{or} \end{cases}$$

with $$\alpha(s_w, s_{wi}) = \begin{cases} \dfrac{s_w - s_{wi}}{s_w - s_{wir}} \text{ for all } s_{wi} < s_w \leq 1 - s_{orw} \\ \dfrac{s_w - s_{wi}}{s_w - s_{wi}^*(s_w)} \text{ for all } 1 - s_{orw} < s_w \leq 1 - s_{or} \end{cases}$$

where $\alpha(s_w, s_{wi})$ is a weight function that has a value in the range between 0 and 1, $s^*_{wi}$ is a historical minimal saturation corresponding to a current water saturation $S_w$ on a connector curve, $k_r^{scan}$ is a relative permeability, $k_r^{conn}$ is a connector curve, $k_r^{drn}$ is a drainage curve, $k_r^{imb}$ is an imbibition curve, $s_{wi}$ is a historical minimal water saturation, $s_{orw}$ is a residual oil saturation after water flood, $s_{or}$ is a residual oil saturation and $s_w$ is the current water saturation.

21. The system claim 15, wherein the set of instructions, when executed by the processor, are further configured to: generate one or more isomorphic reversible scanning curves comprises computing a Convex Isomorphic Algorithm (CIA) set forth in the following:

$$p_c^{scan}(s_w,s_{wi}) = \beta(s_{wi})(p_c^{drn}(s_w) - p_c^{imb-ssi}(s_w,s_{wi})) + p_c^{imb-ssi}(s_w,s_{wi})$$

where $p_c^{imb-ssi}(s_w, s_{wi})$ is obtained using a shift and scale isomorphism and $$\beta(s_{wi}) = \frac{p_c^{scan}(1 - s_{or}(s_{wi})) - p_c^{imb}(1 - s_{orw})}{p_c^{drn}(1 - s_{or}(s_{wi})) - p_c^{imb}(1 - s_{orw})}$$

where $p_c^{scan}$ is a scanning curve, $k_r^{conn}$ is a connector curve, $p_c^{drn}$ is a drainage curve, $p_c^{imb}$ is an imbibition curve, $s_{wi}$ is a historical minimal water saturation, $s_{orw}$ is a residual oil saturation after water flood, $s_{or}$ is a residual oil saturation and $s_w$ is a current water saturation.

22. The system of claim 15, wherein the set of instructions, when executed by the processor, are further configured to: generate one or more isomorphic reversible scanning curves comprises computing a Scale and Shift Isomorphic Algorithm (SSIA) set forth in the following:

$$kr^{scan}(s_w, s_{wi}) = \begin{cases} kr^{imb}(\alpha(s_w, s_{wi})^p(s_w - s_{imb}(s_w)) + s_{imb}(s_w)) \text{ for all } s_{wi} < s_w \leq 1 - s_{orw} \\ kr^{imb}(\alpha(s_w, s_{wi})^p((1 - s_{orw}) - s_{imb}(s_w)) + s_{imb}(s_w)) \text{ for all } 1 - s_{orw} < s_w \leq 1 - s_{or} \end{cases}$$

with $$\alpha(s_w, s_{wi}) = \begin{cases} \dfrac{s_w - s_{wi}}{s_w - s_{wir}} & \text{for all } s_{wi} < s_w \leq 1 - s_{orw} \\ \dfrac{s_w - s_{wi}}{s_w - s^*_{wi}(s_w)} & \text{for all } 1 - s_{orw} < s_w \leq 1 - s_{or} \end{cases} \quad \text{and } s_{imb} = kr^{imb-1}(kr^{drn}(s_w))$$

where $\alpha(s_w, s_{wi})$ is a weight function that has a value in the range between 0 and 1, $s^*_{wi}$ is a historical minimal saturation corresponding to a current water saturation $S_w$ on a connector curve, $k_r^{scan}$ is a relative permeability, $k_r^{drn}$ is a drainage curve, $k_r^{imb}$ is an imbibition curve, $s_{wi}$ is a historical minimal water saturation, $s_{orw}$ is residual oil saturation after water flood, $s_{or}$ is a residual oil saturation and $s_w$ is the current water saturation.

23. The system of claim 15, wherein the set of instructions, when executed by the processor, are further configured to: generate one or more isomorphic reversible scanning curves comprises computing an Inverse Isomorphic Algorithm (IIA) by solving a nonlinear expression to obtain a scanning curve value at a given current water saturation $S_w$, wherein the bounding curves are monotonic functions.

* * * * *